(12) United States Patent
Champy et al.

(10) Patent No.: US 9,766,596 B2
(45) Date of Patent: Sep. 19, 2017

(54) WAKE UP TO A CAST ALARM OR AN ALARM PLUS CONTENT PROMPT

(71) Applicant: GOOGLE INC., Mountain View, CA (US)

(72) Inventors: Adam Champy, Mountain View, CA (US); Adam Glazier, Oakland, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/794,486

(22) Filed: Jul. 8, 2015

(65) Prior Publication Data

US 2017/0010587 A1    Jan. 12, 2017

(51) Int. Cl.
*G08B 1/00* (2006.01)
*G04G 15/00* (2006.01)
(Continued)

(52) U.S. Cl.
CPC ............. *G04G 15/00* (2013.01); *G04G 13/02* (2013.01); *G04G 13/026* (2013.01); *G06F 9/4843* (2013.01); *H04M 1/7253* (2013.01); *H04M 1/72533* (2013.01); *H04M 1/72566* (2013.01); *G08B 5/22* (2013.01)

(58) Field of Classification Search
CPC . G08B 5/22; G06F 9/542; G06F 9/541; G06F 3/04842; G06F 3/0481; G06F 3/0482; G06F 8/61; H04M 1/72566; H04M 1/72533; G04C 13/02

See application file for complete search history.

(56) References Cited

U.S. PATENT DOCUMENTS 7,468,934 B1 * 12/2008 Janik ...................... G04G 11/00
                                                                          368/13
8,050,652 B2 * 11/2011 Qureshey .......... G06F 17/30749
                                                                          455/344
(Continued)

FOREIGN PATENT DOCUMENTS

EP            2395807 A1    12/2011
WO       2011/041868 A1     4/2011
(Continued)

OTHER PUBLICATIONS

"Alarm Manager", Android Developers, available onlibne at <http://developer.android.com/reference/android/app/Alarm-Manager.html>, retrieved on Feb. 22, 2015, 9 pages.
(Continued)

*Primary Examiner* — Joseph Feild
*Assistant Examiner* — Rufus Point
(74) *Attorney, Agent, or Firm* — Brake Hughes Bellermann LLP

(57) ABSTRACT

In one general aspect, a method can include setting an alarm on a computing device. The setting can include setting a predetermined time to trigger the alarm, indicating a target application to launch when the alarm is triggered, and identifying content for access by the target application when the target application is launched. The method can include launching the target application based on the triggering of the alarm, identifying an external device for execution of the identified content, and providing the identified content for execution on the external device.

30 Claims, 15 Drawing Sheets

(51) Int. Cl.
*G04G 13/02* (2006.01)
*H04M 1/725* (2006.01)
*G06F 9/48* (2006.01)
*G08B 5/22* (2006.01)

(56) References Cited

U.S. PATENT DOCUMENTS

| | | | | |
|---|---|---|---|---|
| 8,259,535 | B2* | 9/2012 | Sandu | A61M 21/00 362/253 |
| 8,359,382 | B1* | 1/2013 | Gailloux | H04N 21/23424 709/206 |
| 8,803,690 | B2* | 8/2014 | Junqua | G06F 17/30292 340/309.4 |
| 9,032,463 | B2* | 5/2015 | Kim | H04N 7/17318 725/110 |
| 2002/0002039 | A1* | 1/2002 | Qureshey | G06F 17/30749 455/344 |
| 2005/0201360 | A1* | 9/2005 | Redstone | H04L 12/66 370/352 |
| 2006/0271695 | A1* | 11/2006 | Lavian | G06F 21/552 709/229 |
| 2007/0273506 | A1* | 11/2007 | Butler | G04G 13/021 340/539.18 |
| 2008/0177822 | A1* | 7/2008 | Yoneda | H04L 12/282 709/202 |
| 2009/0049554 | A1* | 2/2009 | Vuong | H04L 67/1095 726/26 |
| 2009/0249222 | A1* | 10/2009 | Schmidt | H04N 21/2368 715/751 |
| 2010/0095332 | A1* | 4/2010 | Gran | G06F 17/30038 725/93 |
| 2010/0115559 | A1* | 5/2010 | Ellis | H04N 5/44543 725/53 |
| 2011/0093896 | A1* | 4/2011 | Xing | H04N 5/44513 725/40 |
| 2011/0098087 | A1* | 4/2011 | Tseng | G01C 21/265 455/557 |
| 2011/0131518 | A1* | 6/2011 | Ohashi | H04L 12/2812 715/769 |
| 2011/0170004 | A1* | 7/2011 | Nunes | H04H 20/61 348/500 |
| 2011/0173666 | A1* | 7/2011 | Yu | H04N 7/17318 725/47 |
| 2011/0242945 | A1* | 10/2011 | Iglesias | G04G 11/00 368/12 |
| 2012/0036220 | A1* | 2/2012 | Dare | G06F 8/61 709/217 |
| 2012/0054808 | A1* | 3/2012 | Nijim | H04N 21/47202 725/88 |
| 2013/0054742 | A1* | 2/2013 | Tsuji | H04N 21/4122 709/217 |
| 2013/0165164 | A1* | 6/2013 | Rowe | H04N 21/4126 455/466 |
| 2013/0176127 | A1* | 7/2013 | Junqua | G06F 17/30292 340/573.1 |
| 2013/0290551 | A1* | 10/2013 | Yang | H04L 12/2803 709/228 |
| 2013/0300547 | A1* | 11/2013 | Park | H04L 12/2809 340/12.22 |
| 2014/0075051 | A1* | 3/2014 | Zadesky | G06F 13/385 710/3 |
| 2014/0122737 | A1* | 5/2014 | Silberstein | G06F 17/30041 709/231 |
| 2014/0167686 | A1* | 6/2014 | Raduchel | H04L 67/303 320/107 |
| 2014/0179229 | A1* | 6/2014 | Lin | H04W 8/005 455/41.2 |
| 2014/0226529 | A1* | 8/2014 | Harris | H04L 67/303 370/255 |
| 2014/0277843 | A1* | 9/2014 | Langlois | H04M 1/6091 701/2 |
| 2015/0116113 | A1* | 4/2015 | Caine | G04G 13/02 340/539.11 |
| 2015/0161882 | A1* | 6/2015 | Lett | G08B 25/001 340/506 |
| 2015/0382050 | A1* | 12/2015 | Le Nerriec | H04L 45/16 725/80 |
| 2016/0065155 | A1* | 3/2016 | Bharj | H03G 1/02 381/105 |
| 2016/0165038 | A1* | 6/2016 | Lim | H04M 1/72533 715/728 |

FOREIGN PATENT DOCUMENTS

| | | |
|---|---|---|
| WO | 2014/005868 A1 | 1/2014 |
| WO | 2017/007596 A1 | 1/2017 |

OTHER PUBLICATIONS

Allan, Patrick, "Build a Weather Reporting, News Reading Alarm Clock with a Raspberry Pi", available online at <http://lifehacker.com/build-a-weather-reporting-news-reading-alarm-clock-wit-1631194546>, retrieved on Feb. 22, 2015, 3 pages.

"Coolstart Remote Start Temperature Timer and Display", available online at <http://www.autotoys.com/x/product.php?productid=5182>, retrieved on Feb. 22, 2015, 4 pages.

Netflix, Inc., "Dial", available online at <http://www.dial-multiscreen.org/>, retrieved on Feb. 23, 2015, 2012, 2 pages.

Github, Inc., "Mac Framework for Working with Google Cast devices", available online at <https://github.com/acj/OpenCast>, retrieved on Feb. 23, 2015, 2 pages.

amazon.com, Inc., "Sony ICF-CD815 AM/FM Stereo CD Clock Radio with Dual Alarm", available online at <http://www.amazon.com/Sony-ICF-CD815-Stereo-Discontinued-Manufacturer/dp/B000MXYPYW/ref=sr_1_1?ie=UTF8&qid=1434436381&sr=8-1&keywords=sony+ICF-CD815+AM%2FFM+Stereo+CD+Clock+Radio+with-Dual+Alarm&pebp=1434436384931&perid=E6614C48FD6E4C05A04C>, retrieved on Feb. 22, 2015, 7 pages.

"Start App at a Specific Time", available online at <http://stackoverflow.com/questions/4452565/start-app-at-a-specific-time>, retrieved on Feb. 22, 2015, 5 pages.

International Search Report and Written Opinion for PCT Patent Application No. PCT/US2016/038359, mailed on Sep. 19, 2016, 16 pages.

* cited by examiner

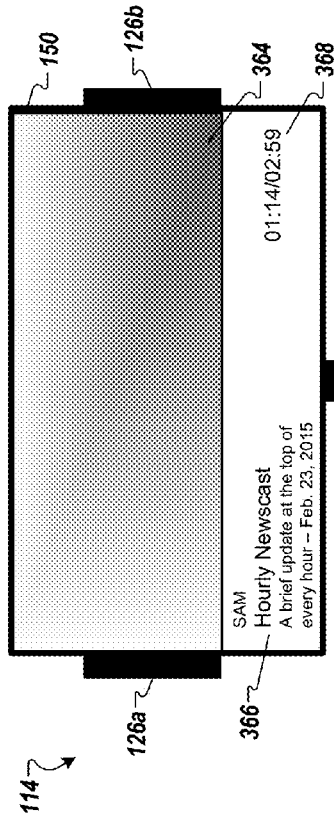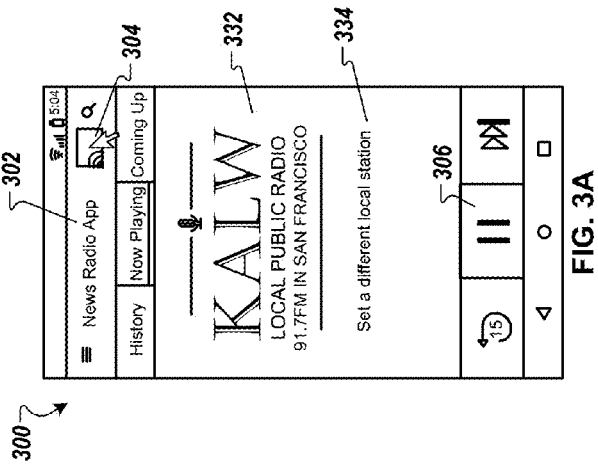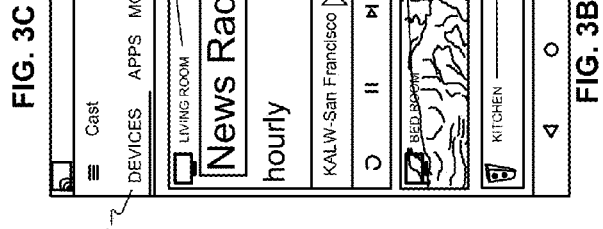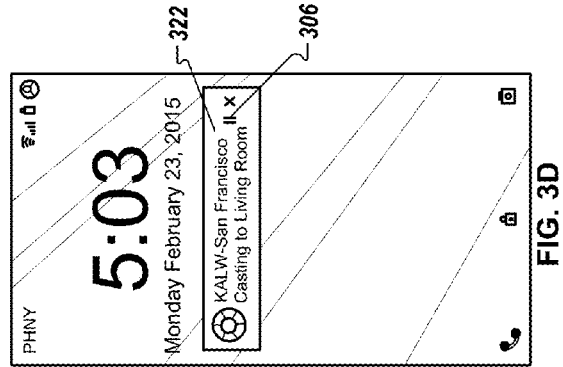

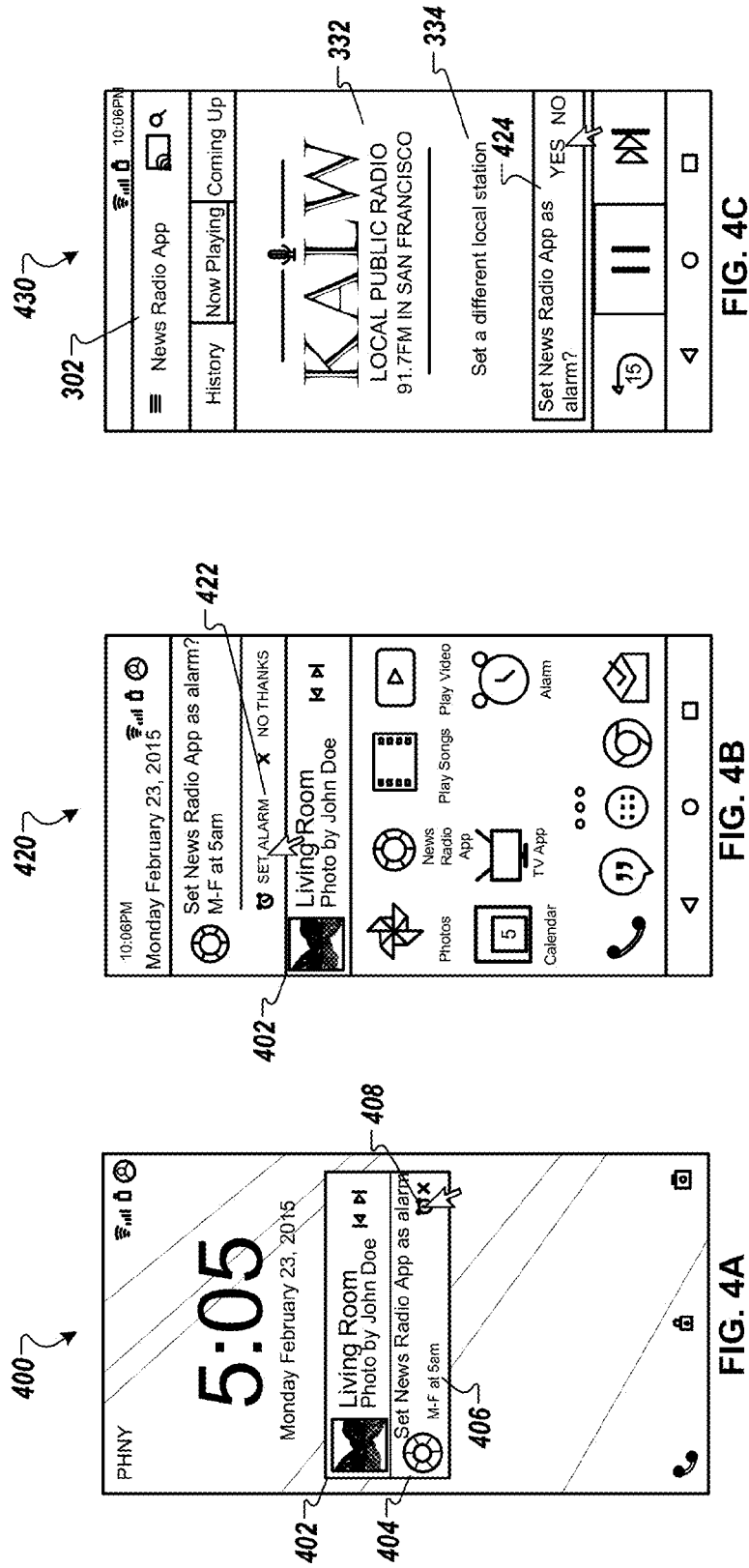

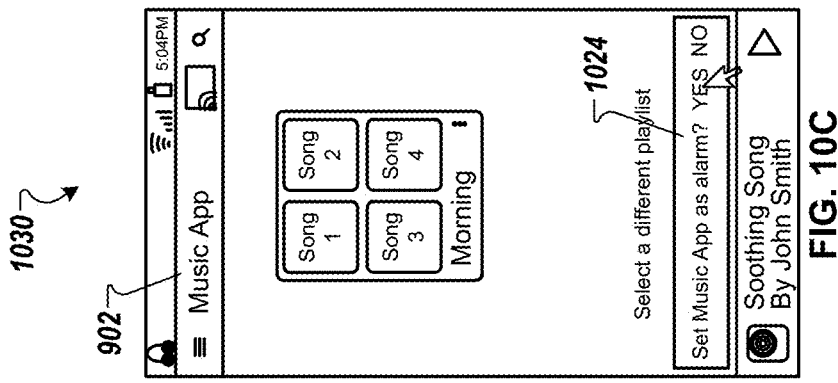
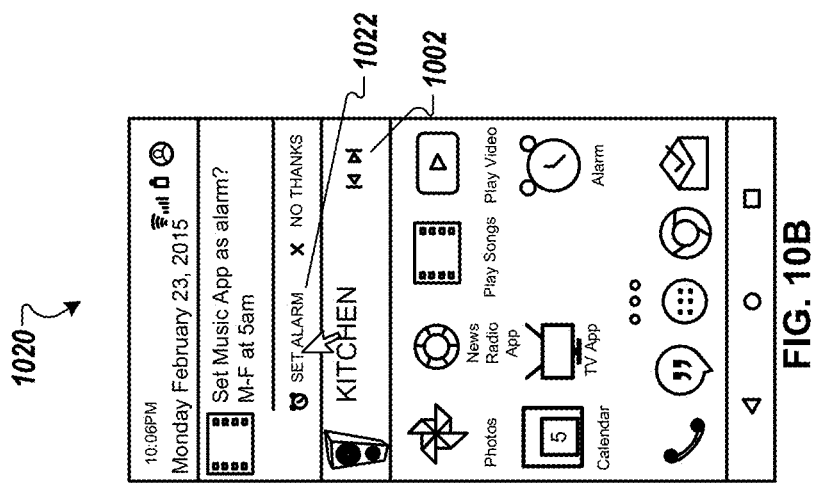
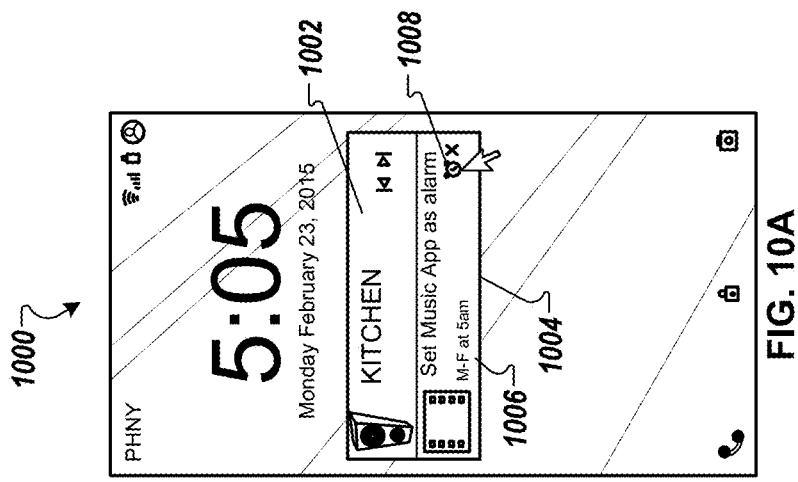
FIG. 10C
FIG. 10B
FIG. 10A

WAKE UP TO A CAST ALARM OR AN ALARM PLUS CONTENT PROMPT

TECHNICAL FIELD

This description generally relates to computing devices. The description, in particular, relates the use of alarms on a computing device.

BACKGROUND

Many users use an alarm clock to wake them up. Once awake, a user may routinely perform one or more actions. A user may listen to music. The music can be on a MP3 player, a mobile computing device (e.g., a phone, laptop computer, notebook computer, etc.), or may be a compact disc (CD) played on a player included in the alarm clock or external from the alarm clock. A user may turn on a television. The user may watch the morning news, or access a particular channel that provides the weather report. The user may perform these actions as soon as they wake up or as part of their morning routine.

SUMMARY

In one general aspect, a method can include setting an alarm on a computing device. The setting can include setting a predetermined time to trigger the alarm, indicating a target application to launch when the alarm is triggered, and identifying content for access by the target application when the target application is launched. The method can include launching the target application based on the triggering of the alarm, identifying an external device for execution of the identified content, and providing the identified content for execution on the external device.

Example implementations may include one or more of the following features. For instance, the computing device can include a mobile computing device in communication with a computer system by way of a network. The external device can include a display device in communication with the computer system by way of the network. The content can include streaming media being provided by the computer system. The streaming media can include video and audio content. The video content can be for display in a display area of the display device. The audio content can be for playing on speakers included in the display device. The computing device can include a mobile computing device in communication with a computer system by way of a network. The external device can include at least one speaker. The at least one speaker can be in communication with the computer system by way of the network. The content can include streaming audio content being provided by the computer system for playing on the at least one speaker. The setting of the alarm can be performed by an alarm application executing on the computing device. Identifying content for access by the target application when launched can include identifying a specific intent for capture by the target application. Launching the target application based on the triggering of the alarm can include capturing, by the target application, the specific intent. Identifying content for access by the target application when launched can include identifying application specific parameters. Launching the target application based on the triggering of the alarm can include providing the application specific parameters to the target application. The setting of the alarm can be performed by an alarm application executing on the computing device. The application specific parameters can be set in the alarm application. The application specific parameters can be set in a settings application executing on the computing device. The application specific parameters can be based on user interactions with the target application on the computing device.

In another general aspect, a non-transitory, machine-readable medium has instructions stored thereon. The instructions, when executed by a processor, can cause a computing device to set an alarm on a computing device. The alarm can be set to trigger at a predetermined time. The instructions, when executed by a processor, can cause a computing device to launch a target application on the computing device based on the triggering of the alarm at the predetermined time, identify an external device for execution of particular content accessible by the target application, and provide an indication of the particular content for execution on the external device.

Example implementations may include one or more of the following features. For instance, the computing device can include a mobile computing device in communication with a computer system by way of a network. The external device can include a display device in communication with the computer system by way of the network. The content can include streaming media being provided by the computer system. The streaming media can include video and audio content. The video content can be for display in a display area of the display device. The audio content can be for playing on speakers included in the display device. The computing device can include a mobile computing device in communication with a computer system by way of a network. The external device can be a display device in communication with the computer system by way of the network. The content can include streaming media being provided by the computer system. The streaming media can include video and audio content. The video content can be for display in a display area of the display device. The audio content can be for playing on speakers included in the display device. The external device can include at least one speaker. The at least one speaker can be in communication with the computer system by way of the network. The content can include streaming audio content being provided by the computer system. The streaming audio content can be for playing on the at least one speaker.

In yet another general aspect, a system can include a network, a computer system including a content repository, a computing device in communication with the network, and a display device including a display area and at least one speaker. The computer system can be in communication with the network. The computing device can include a target application and an alarm application. The alarm application can be configured to set an alarm to trigger at a predetermined time, and indicate that the target application be launched when the alarm is triggered. The target application can be configured to identify content included in the content repository. The content can be accessible by the target application. The display device can be configured to receive the identified content when the target application is launched based on the triggering of the alarm, display a video portion of the identified content in the display area, and play an audio portion of the identified content on the at least one speaker.

Example implementations may include one or more of the following features. For instance, the target application can be further configured to identifying the display device for execution of the identified content. The target application can be further configured to capture a specific intent when the target application is launched. The target application can be further configured to utilize application specific parameters when the target application is launched. The audio portion of the identified content can include music. The video portion of the identified content can include a picture.

The details of one or more implementations are set forth in the accompanying drawings and the description below. Other features will be apparent from the description and drawings, and from the claims.

BRIEF DESCRIPTION OF THE DRAWINGS

FIG. 3A is a diagram that shows an example user interface for a first cast-enabled application.

FIG. 3B is a diagram that shows an example first cast user interface that includes a living room indicator, a bedroom indicator, and a kitchen indicator included in a devices tab of the first cast user interface.

FIG. 3C is a diagram that shows first content provided by a computing device to a display device.

FIG. 3D is a diagram that shows an example user interface that can be displayed on a display device of a computing device, the user interface providing a casting indication to the user that a radio station is being provided to a first external device.

FIG. 4A is a diagram that shows an example user interface that can be displayed on a display device of a computing device, the user interface providing a casting indication to the user that a photo is being provided to a first external device.

FIG. 4B is a diagram that shows an example user interface that can be displayed on a display device of a computing device that can allow a user to select activation of a first cast-enabled application when an alarm is triggered on the computing device.

FIG. 4C is a diagram that shows an example user interface for a first cast-enabled application that provides an alarm confirmation selection that allows a user to confirm the launching, unpausing, or activation of the first cast-enabled application when an alarm is triggered on a computing device.

FIG. 10A is a diagram that shows an example user interface that can be displayed on a display device of a computing device, the user interface providing a casting indication to the user that a third external device is available for casting.

FIG. 10B is a diagram that shows an example user interface that can be displayed on a display device of a computing device that can allow a user to select activation of a third cast-enabled application when an alarm is triggered on the computing device.

FIG. 10C is a diagram that shows an example user interface for a third cast-enabled application that provides an alarm confirmation selection that allows a user to confirm the launching, unpausing, or activation of the third cast-enabled application when an alarm is triggered on a computing device.

Like reference symbols in the various drawings indicate like elements.

DETAILED DESCRIPTION

As an alternative to using an alarm clock, a user may use an alarm application included on a mobile computing device (e.g., a phone, laptop computer, notebook computer, etc.). The alarm application can be set (configured) to provide an audible sound when triggering an alarm. The audible sound can alert or wake up the user. In other implementations, the alarm application can cause a vibration of a device in contact with the user to wake the user, or may cause a light to turn on to wake the user. As described above, once awake a user may routinely perform one or more actions as soon as they wake up or as part of their morning routine.

In some implementations, based on the triggering of the alarm, the mobile computing device can further execute one or more applications that the mobile computing device can use to provide desired content to a user. Content as described and referred to herein can include, but is not limited to, music, streaming video, streaming audio, and streaming media (streaming audio and video. In some implementations, based on the triggering of the alarm, the mobile computing device can further execute one or more applications that can coordinate providing the desired content to other devices that may be in proximity to the mobile computing device (e.g., speakers, televisions). For example, when the alarm is triggered, the mobile computing device can execute a music application that can play pre-selected music choices for a user (e.g., a wake-up playlist). In another example, when the alarm is triggered, the mobile computing device can execute a music application that can play pre-selected music choices on one or more speakers located near the mobile computing device.

Figure 1:
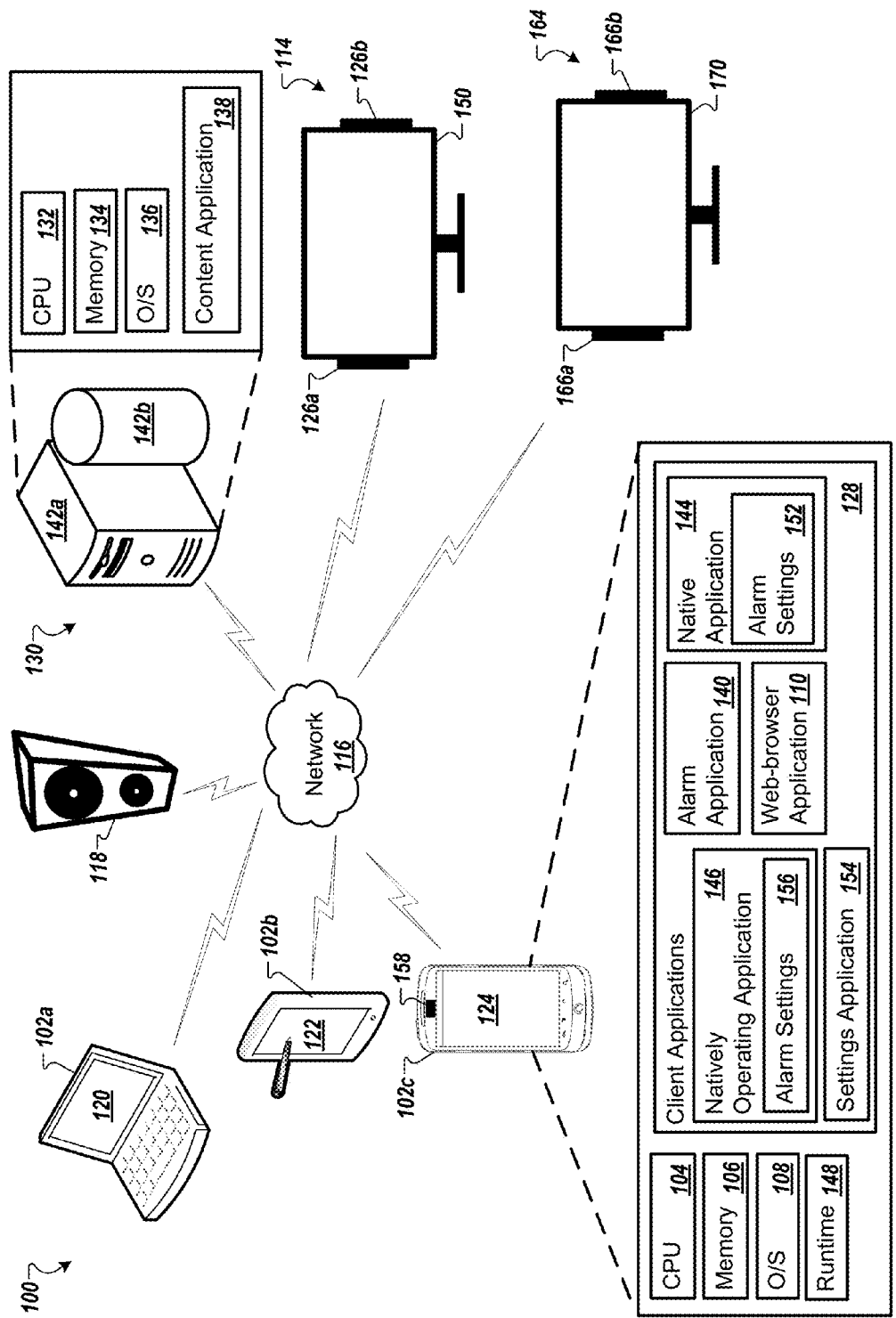
FIG. 1 is a block diagram of an example system that allows a user to wake up to content that can be provided on a mobile computing device and/or one or more external devices.

FIG. 1 is a block diagram of an example system 100 that allows a user to wake up to content that can be provided on a mobile computing device and/or one or more external devices.

The example system 100 includes a plurality of computing devices 102a-c (e.g., a laptop computer, a tablet computer, and a smart phone, respectively). An example computing device 102c (e.g., a smart phone) can include a computing device system 112. The computing device system 112 can include one or more processors (e.g., a client central processing unit (CPU) 104) and one or more memory devices (e.g., a client memory 106)). The computing device 102c can execute a client operating system (O/S) 108 and one or more client applications 128 (e.g., a web browser application 110, a natively operating application 146, and a native application 144) that can display a user interface (UI) on a display device 124 included in the computing device 102c. The computing device 102c can include a microphone/speaker 158. Though a single microphone/speaker is shown in FIG. 1, in some implementations, the computing device 102c can include more than one microphone/speaker (e.g., two or more microphone/speakers, a single microphone/speaker and one or more additional speakers). Though FIG. 1 shows the computing device system 112 as included in the computing device 102c, a computing device system similar to the computing device system 112 can be included in each of the computing devices 102a-b, and can perform operations and functions in a manner similar to the computing device system 112.

The system 100 can include a computer system 130 that can include one or more computing devices (e.g., a server 142a) and one or more computer-readable storage devices (e.g., a database 142b). The server 142a can include one or more processors (e.g., a server CPU 132), and one or more memory devices (e.g., a server memory 134). The computing devices 102a-c can communicate with the computer system 130 (and the computer system 130 can communicate with the computing devices 102a-c) using a network 116. The server 142a can execute a server O/S 136.

The system 100 can include a first display device 114 (e.g., a television (TV)), a second display device 164 (e.g., a television (TV)), and a speaker 118. The first display device 114 can include a display area 150. The first display device 114 can include built-in speakers 126a-b. The second display device 164 can include a display area 170. The second display device 164 can include built-in speakers 166a-b. Two built-in speakers 126a-b and 166a-b are shown in FIG. 1 for first display device 114 and the second display device 164, respectively, however, the first display device 114 and/or the second display device 164 can include less than two built-in speakers (e.g., a single built-in speaker) or more than two built-in speakers (e.g., three or more built-in speakers). In some implementations, the first display device 114 and/or the second display device 164 may interface with one or more external speakers in addition to the built-in speakers 126a-b and the built-in speakers 166a-b, respectively. In some implementations, a display device (e.g., the first display device 114 and/or the second display device 164) may not include built-in speakers and, for the playing of audio content, the display device may interface with one or more external speakers.

Though the system 100 includes a first display device 114 and a second display device 164, example systems can include a single (one) display device or more than two display devices (e.g., three or more display devices). Though FIG. 1 shows a speaker 118, in some implementations, the system 100 can include more than one speaker (e.g., two or more speakers).

In some cases, the server 142a can be a content server and the database 142b can be a content repository. The server 142a can execute a content application 138 that can provide content to the computing devices 102a-c. The content application 138 can provide content to the first display device 114 and/or the speaker 118 under the initiation, control, and direction of one of the computing devices 102a-c.

In some implementations, the computing devices 102a-c can be laptop or desktop computers, smartphones, personal digital assistants, portable media players, tablet computers, or other appropriate computing devices that can communicate, using the network 116, with other computing devices or computer systems. In some implementations, the computing devices 102a-c can perform client-side operations, as discussed in further detail herein. Implementations and functions of the system 100 described herein with reference to computing device 102c, may also be applied to computing device 102b and computing device 102a and other computing devices not shown in FIG. 1 that may also be included in the system 100. The computing device 102b includes a display device 122. The computing device 102a includes a display device 120. The display device 120 and the display device 122 may function in a similar manner as the display device 124. Though not shown in FIG. 1, the computing device 102a and the computing device 102b may include one or more speakers that can function in a similar manner as the microphone/speaker 158.

In some implementations, the computer system 130 can represent more than one computing device working together to perform server-side operations. For example, though not shown in FIG. 1, the system 100 can include a computer system that includes multiple servers (computing devices) working together to perform server-side operations. In this example, a single proprietor can provide the multiple servers. In some cases, the one or more of the multiple servers can provide other functionalities for the proprietor. In a non-limiting example, the computer system can also include a search server, a web crawler server, and a marketplace server.

In some implementations, the network 116 can be a public communications network (e.g., the Internet, cellular data network, dialup modems over a telephone network) or a private communications network (e.g., private LAN, leased lines). In some implementations, the computing devices 102a-c can communicate with the network 116 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

The web browser application 110 can execute, interpret, and/or display a browser-based application. A browser-based application can run inside a tab or instance of the web browser application using a dedicated user interface, and can provide functionality and an experience that is more rich and interactive than a standalone website but that is less cumbersome and monolithic than the native application 144. Examples of browser-based applications can include, but are not limited to, games, photo editors, and video players that can run inside the web browser application 110. The browser-based application can provide a dedicated UI for display on the display device 124.

Browser-based applications can be "hosted applications" or "packaged applications." Hosted applications may include at least a portion of a web site that itself includes web pages, in addition to some metadata that may be especially pertinent to the browser-based application or to the user of the browser-based application to allow the browser-based application to perform some particular functionality for the user. Packaged applications can be browser-based applications whose code is bundled, so that the user can download all of the content of the browser-based application for execution by the browser. A packaged browser-based application may not need to have network access to perform its functionality for the user, and may be executed successfully by the browser locally on the computing device without access to a network. Packaged browser-based applications have the option of using Extension APIs, allowing packaged applications to change the way the browser behaves or looks.

In some implementations, the computing device 102c can run, or cause the operating system 108 to execute, the web browser application 110. The web browser application 110 can then provide, in a web browser UI, a plurality of panes or tabs. In a graphical user interface (GUI) used in the computing device 102c, the web browser UI can be a two-dimensional object arranged on a plane of the GUI known as a desktop. The web browser UI can include other graphical objects (e.g., a menu-bar, toolbars, controls, icons). The web browser UI can display the graphical objects on the display device 124. A user of the computing device 102c can interact with the graphical objects to provide input to, or otherwise control the operation of, the web browser application 110.

In some implementations, a web browser application (e.g., the web browser application 110) can provide or "cast" a first tab or page of the web browser application to a device external from the computing device (e.g., the computing device 102c) that is executing the web browser application. For example, an external device can be an external display device (e.g., the first display device 114) and/or one or more external speakers (e.g., built-in speakers 126a-b and speaker 118). In some implementations, the web browser application can provide a user interface for initiating and controlling the casting of the first tab. In addition, for example, a Web Real-Time Communication (WebRTC) application program interface (API) can be used for browser-based real-time communications.

The natively operating application 146 can be an application that is coded using only web technology (defined here as code that can be implemented directly by a web browser application), such as JavaScript, ActionScript, HTML, or CSS. For example, the computing device 102c can download and install the natively operating application 146 from a marketplace server using a web browser application (e.g., web browser application 110). The natively operating application 146 can operate using a runtime 148. For example, the CPU 104 or by the O/S 108 can execute or run the natively operating application 146 using the runtime 148. Because the natively operating application 146 is coded using web technologies, no compilation step is required.

Native applications (e.g., the native application 144) can include machine executable code and can be executed directly by the O/S 108 of the client device, whereas, a browser-based application may be incapable of execution without the aid of the web browser application 110.

The client applications 128 can present, provide, cast, or capture and mirror content to one or more external devices. For example, the natively operating application 146 and the native application 144 can present, provide, cast, or capture and mirror streaming media (e.g., streaming audio and video content) to the first display device 114 for displaying the streaming video content in the display area 150 and for playing the streaming audio content on the built-in speakers 126a-b. In another example, the natively operating application 146 and the native application 144 can present, provide, cast, or capture and mirror streaming audio content to the speaker 118. The client applications 128 can include a UI that can be presented on the display device 124 of the computing device 102c. A user can interact with the UI and provide inputs and selections for controlling the providing or casting of the streaming media content to the external devices.

In some implementations, the computing device 102c can display content in a tab or page of a web browser application. The web browser application can provide or "cast" the tab or page to a cast-enabled device (e.g., the first display device 114, the speaker 118). A cast-enabled device can communicate with a network (e.g., the network 116) using a high-speed wireless protocol such as WiFi, Bluetooth, or Bluetooth LE. For example, the web browser application can provide a user interface for initiating and controlling the casting of the tab. The user of the computing device 102c can provide or "cast" the tab for viewing on the first display device 114 by selecting an icon included on the user interface for the web browser application that initiates the casting of the tab. The content can be provided from the server 142a by the content application 138 to the first display device 114 by way of the network 116 by using a high-speed wireless protocol (e.g., WiFi, Bluetooth, Bluetooth LE). The computing device 102c communicates with the server 142a by way of the network 116 by using a high-speed wireless protocol (e.g., WiFi, Bluetooth, Bluetooth LE) to control the content provided to the first display device 114.

The client applications 128 can be cast-enabled applications that can control the providing of content to cast-enabled devices (e.g., the first display device 114, the speaker 118). For example, a cast-enabled application can provide a user interface for initiating and controlling the casting of the content from the application to the cast-enabled device. The user of the computing device 102c can provide or "cast" the content to the first display device 114 by selecting an icon included on the user interface for the cast-enabled application that initiates the casting.

The computing device 102c can act as a controller for content provided or casted to the cast-enabled device (e.g., the first display device 114, the speaker 118). For example, the natively operating application 146 and the native application 144 can be cast-enabled applications. For example, the content can be a movie and a user can touch (contact, tap) icons provided in a user interface of the application to control the playing of a movie. For example, the content can be audio content (e.g., streaming audio from an online radio station) and a user can touch (contact, tap) icons provided in a user interface of the application to control the playing of the audio content.

In some implementations, the alarm application 140 can provide a user interface on the display device 124 of the computing device 102c that allows a user to set an alarm, and to select an application included on the computing device 102c (e.g., the natively operating application 146, the native application 144) that can be launched when the alarm triggers. In addition, in some implementations, the user can provide a specific intent for the selected application to capture when the selected application is launched. In some implementations, when selecting the natively operating application 146, a user can access an alarm settings interface 156 included in the natively operating application 146 to provide a specific intent for the natively operating application 146 to capture when the natively operating application 146 is launched by the alarm application 140. In some implementations, when selecting the native application 144, a user can access an alarm settings interface 152 included in the native application 144 to provide a specific intent for the native application 144 to capture when the native application 144 is launched by the alarm application 140. For example, the selected application can be a weather application and the specific intent can be to capture the weather report for a specified location (e.g., a city) when the application is launched when the alarm triggers.

In some implementations, the alarm application 140 can provide a user interface on the display device 124 of the computing device 102c that allows a user to set or select application specific parameters that the alarm application 140 can provide to or pass to the selected application when the alarm is triggered. In some implementations, a settings application 154 executing on the computing device 102c can provide a user interface on the display device 124 of the computing device 102c that allows a user to set or select application specific parameters that the selected application can use when the alarm is triggered. In some implementations, the application specific parameters can be one or more rules that the selected application can use when providing content to the user when the alarm is triggered. In some implementations, a user may be prompted by the selected application when the selected application is launched is response to the alarm trigger. The prompting can allow the user to select or confirm content for viewing/listening to now that the alarm is triggered.

For example, the selected application can be a podcast application. A first specific parameter can be the title of a pod cast and a second specific parameter can be a setting that specifies selecting of a recently available episode (e.g., an episode of the pod cast for the current day). In this example, the content provided by the podcast application when triggered by the alarm application (e.g., the pod cast having the specified title) can be varied on a daily basis.

For example, the selected application can be an Internet radio application. A specific parameter can be a particular radio station. In this example, the content provided by the radio application when triggered by the alarm application will be the playing of the particular radio station.

For example, the selected application can be a music application (e.g., an application that plays music). A first specific parameter can be the title or other indication of a playlist (e.g., a collection of audio content (e.g., songs)) and a second specific parameter can be a setting that specifies selecting the latest version of the playlist. In this example, the content provided by the music application when triggered by the alarm application (e.g., the playing of the audio content in the playlist) can vary based on the version of the playlist.

For example, the selected application can be weather application. A first specific parameter can be a city. For example, the user can enter the name of the city. In another example, the first specific parameter can be an indication that the weather application determine the current location of the user (e.g., the current location of the computing device) and use the determined current location as the city. A second specific parameter can be to provide the latest weather report for the specified city. In some implementations, the weather application can default to providing the latest weather report for the specified city and the second specific parameter may not be needed. In this example, the content provided by the weather application when triggered by the alarm application will be the latest (most recent) weather report for the specified city. In some implementations, the weather application, when triggered by the alarm application, can automatically provide a latest (most recent) weather report for a specified city. In some implementations, the weather application, when triggered by the alarm application, can provide a notification to the user allowing the user to confirm (or select) a latest (most recent) weather report for a specified city.

For example, the selected application can be a map application. A specific parameter can be a location (e.g., a city, an address or a landmark). For example, the user can enter the name of the city, the address, or the name of the landmark. In another example, the first specific parameter can be an indication that the map application determine the current location of the user (e.g., the current location of the computing device). In this example, the content provided by the map application when triggered by the alarm application can be a traffic report for the specified parameter (e.g., city, address, or location around the landmark).

For example, the selected application can be a news application. A specific parameter can be a location (e.g., a city, state, country, address, etc.). As described, in some cases, the user may enter the location. In some cases, the location can be the current location of the computing device as determined by the computing device. In this example, the content provided by the news application when triggered by the alarm application will be a current news report for the specified location.

Figure 2A:
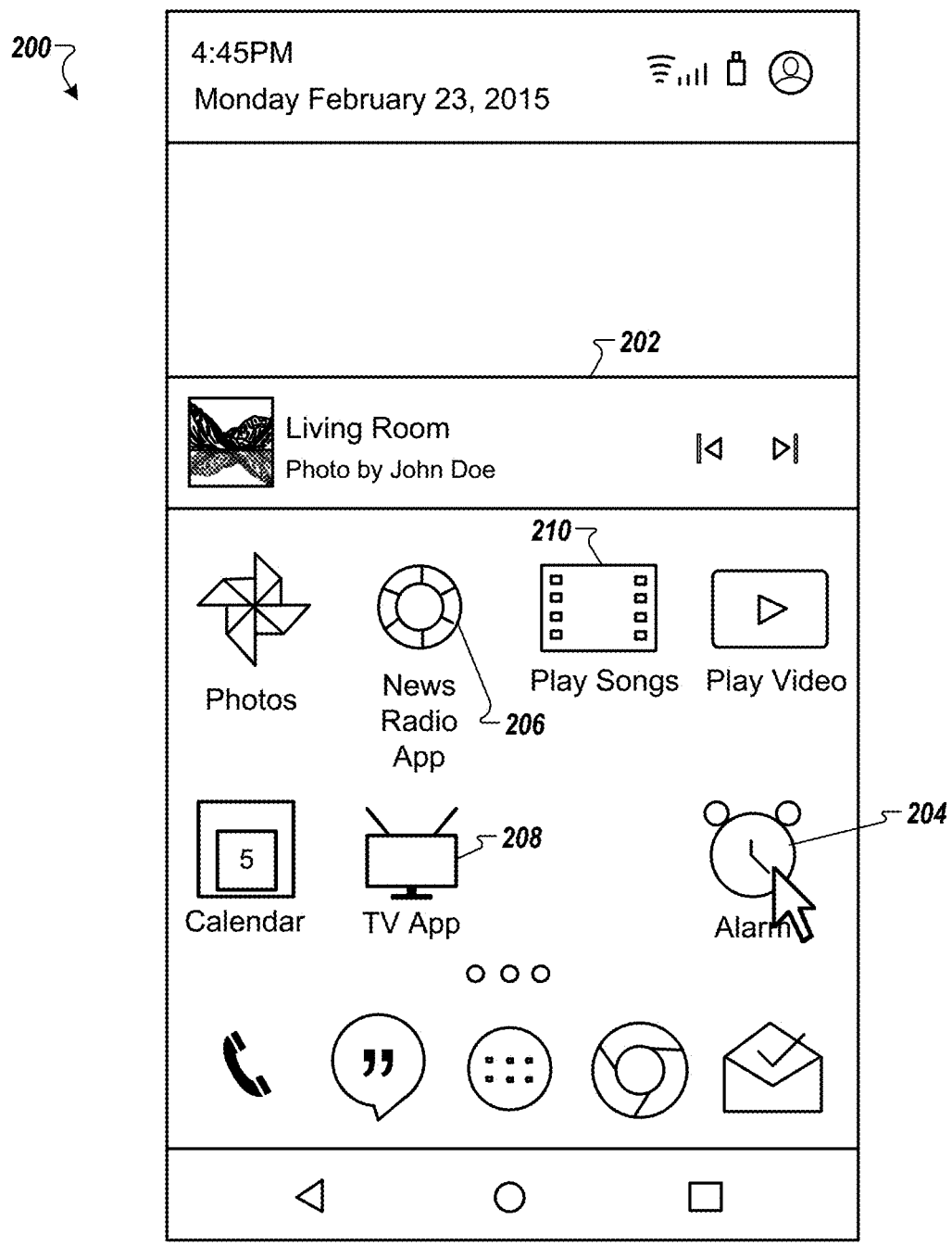
FIG. 2A is a diagram that shows an example user interface that can be displayed on a display device of a computing device, the example user interface providing a casting indication to a user that a photo is being provided to an external device.

FIG. 2A is a diagram that shows an example user interface 200 that can be displayed on a display device (e.g., the display device 124) of a computing device (e.g., the computing device 102c). The example user interface 200 provides a casting indication 202 to the user that a photo (content) is being provided (presented, cast, or captured and mirrored) to an external device associated with the name "Living Room".

Figure 2B:
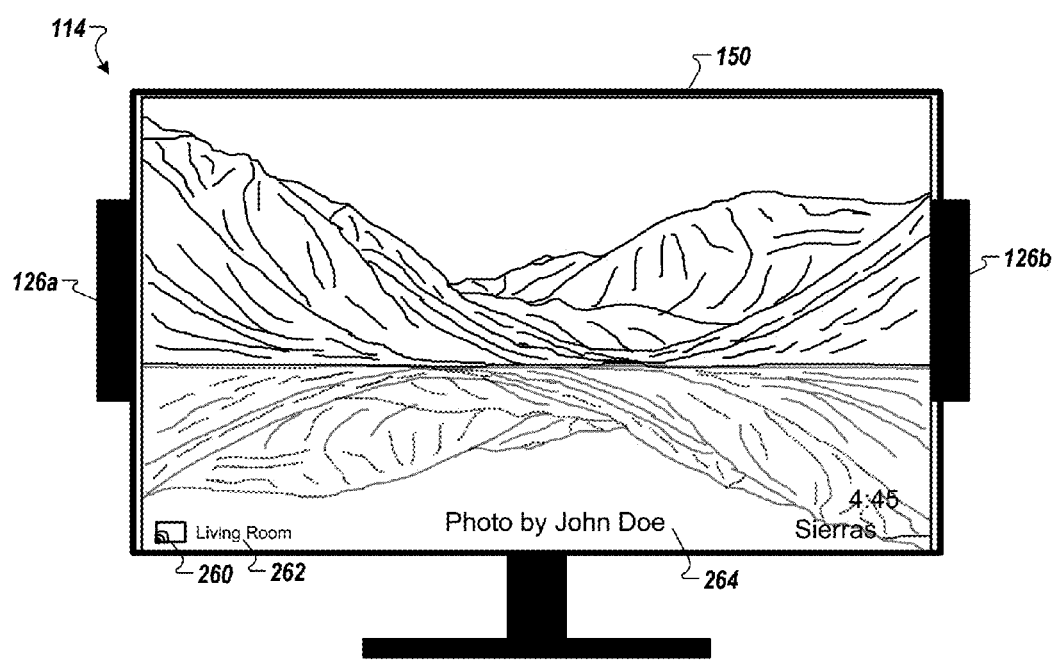
FIG. 2B is a diagram that shows content provided by a computing device to a first display device.

FIG. 2B is a diagram that shows content 264 (e.g., a photo by John Doe) provided (presented, casted, or captured and mirrored) by a computing device (e.g., the computing device 102c) to the first display device 114. The first display device 114 shows (displays) a casting icon 260 and a name 262 (e.g., "Living Room") associated with the external first display device 114. For example, the name 262 can be the location within a residence of the user where the external first display device 114 is located.

For example, the computing device 102c can identify the external first display device 114 and can provide (present, cast, or capture and mirror) the content 264 to the identified external first display device 114. In some implementations, the computing device 102c can identify the external first display device 114 based on the external first display device 114 being connected to the same wired or wireless network as the computing device 102c (as shown in FIG. 1). In some implementations, the computing device 102c can identify the external first display device 114 based on the external first display device 114 being located near to the computing device 102c. In some implementations, the computing device 102c can identify the external first display device 114 based on the external first display device 114 being located near to the computing device 102c and based on the external first display device 114 being connected to the same wired or wireless network as the computing device 102c (as shown in FIG. 1).

In some implementations, referring to FIG. 1, the computing devices 102a-c can communicate directly with external devices that are located near (e.g., in the same room as) the computing devices 102a-c. For example, the first display device 114 and the computing device 102c can be located in the same room (e.g., a bedroom of a user). The computing device 102c using, for example one or more high-speed wireless communications protocols such as Bluetooth, Bluetooth Low Energy (Bluetooth LE), and WiFi, can use direct communications to identify the first display device 114. In these implementations, identifying the first display device 114 by the computing device 102c includes determining that the first display device 114 and the computing device 102c are within a communication range of the communication protocol.

In some implementations, a computing device (e.g., the computing device 102c) can use short-range communications to "listen" for broadcasts from a short-range communication enabled device (e.g., the first display device 114). For example, the short-range communication can use Bluetooth LE when transmitting and receiving broadcasts. The first display device 114 can be determined to be in proximity to (near) the computing device 102c when the computing device 102c and the first display device 114 are within the range of the short-range communication system (e.g., are within the range of Bluetooth LE).

In some implementations, the system 100 can use WiFi scans, WiFi signal strength information, or WiFi signature matching to determine proximity of a WiFi-enabled computing device to the computing device 102c. For example, a WiFi-enabled computing device (e.g., the computing device 102c) can capture a signal strength of a WiFi signal received from the WiFi-enabled first display device 114. The captured strength of the signal can be indicative of a distance between the first display device 114 and the computing device 102c and can be referred to as a received signal strength indicator (RSSI). The computing device 102c can determine that a captured strength of the signal is within a range indicative of an acceptable proximity (nearness) of the computing device 102c to the first display device 114. For example, the range (e.g., threshold range) can be stored in the client memory 106.

In another example, the computing device 102c can be WiFi-enabled and can use a set of captured signal strengths for sampled reference locations with respect to the first display device 114 to determine if the computing device 102c is proximate to (near, in the same room as) the first display device 114. The captured signal strengths for the sampled reference locations with respect to the first display device 114 can comprise a repository of signal strength signatures for the location of the first display device 114. The computing device 102c can capture a signal strength of a WiFi signal received from the first display device 114. The computing device 102c can compare the captured signal strength to the repository of signal strength signatures to determine a closest match or matches. The computing device 102c can use the determined closest match or matches to determine the proximity of the computing device 102c to the first display device 114.

In some implementations, the computing device 102c can identify more than one (two or more) external devices for providing (presenting, casting, or capturing and mirroring) content (e.g., identify the second display device 164). Referring to FIG. 1, the computing device 102c can identify the first display device 114, the second display device 164, and the speaker 118. Each identified device can have an associated name. For example, the name "Living Room" can be associated with the first display device 114. For example, the name "Bed Room" can be associated with the first display device 114. For example, the name "Kitchen" can be associated with the speaker 118. FIG. 1 shows a first display device 114, second display device 164, and an example speaker 118. In some implementations, a computing device (e.g., the computing device 102c) can identify more than one (two or more) display devices and associate a name with each identified display device. In addition or in the alternative, in some implementations, a computing device (e.g., the computing device 102c) can identify more than one (two or more) speakers and associate a name with each identified speaker.

In some implementations, a software application for a media-streaming service executing on the computing device 102c can discover an external display device (e.g., the first display device 114 and/or the second display device 164) enabled for use with the media-streaming service. The software application for the media-streaming service executing on the computing device 102c can use a protocol for the discovery of the external display device and the launching of the media-streaming service on the external display device to launch content on the external display device provided by the media-streaming service.

Referring back to FIG. 2A, a user can select (highlight, "click on", contact) an alarm icon 204 included in the user interface 200. For example, referring to FIG. 1, the display device 124 of the computing device 102c can display the user interface 200. In some implementations, the display device 124 can be a touchscreen. In these implementations, a user can contact the alarm icon 204 with a finger of the user or a stylus to launch an alarm application associated with the alarm icon 204 and included on the computing device 102c. In some implementations, the display device 120 of the computing device 102a can display the user interface 200. In these implementations, a user can select the alarm icon 204 using a touchpad, trackpad, keyboard, and/or mouse or other type of pointing device. Selecting the alarm icon 204 can launch an alarm application associated with the alarm icon 204 and included on the computing device 102a.

Figure 2C:
FIG. 2C is a diagram that shows an example alarm user interface that can be displayed on a display device of a computing device.

FIG. 2C is a diagram that shows an example alarm user interface 220 that can be displayed on a display device (e.g., the display device 124) of a computing device (e.g., the computing device 102c). The user can interact with the alarm user interface 220 to set a time and day when the alarm will be triggered. In addition, the user can set an alarm type 230 and an alarm tone 232. As will be described herein, the alarm type 230 and the alarm tone 232 can be used in addition to, as an alternate to, or as a backup to other events that can be scheduled to occur when the alarm is triggered.

Referring to FIGS. 2A-C, a user can setup an alarm using an alarm application on a computing device that can provide (present, cast, or capture and mirror) content to an identified external device.

FIGS. 3A-D are diagrams that show providing (presenting, casting, or capturing and mirroring) of selected content (e.g., news radio) by a computing device (e.g., the computing device 102c) to the external first display device 114.

FIG. 3A is a diagram that shows an example user interface 300 for a cast-enabled application (e.g., a news radio application 302). A display device (e.g., the display device 124) of a computing device (e.g., the computing device 102c) can display the user interface 300. For example, referring to FIG. 2A, a user can select a news radio application icon 206. Selecting the news radio application icon 206 can launch the news radio application 302 included on the computing device 102c.

The user interface 300 includes a cast icon 304. A user can select the cast icon 304 in order to provide (present, cast, or capture and mirror) content from the news radio application 302 to an identified external device. The user interface includes a current station indication 332 and a set station selection 334. For example, the user can select the set station selection 334 to select a different (change) the current radio station.

FIG. 3B is a diagram that shows an example cast user interface 318 that includes a living room indicator 312, a bedroom indicator 314, and a kitchen indicator 328 included in a devices tab 316 of the cast user interface 318. A display device (e.g., the display device 124) of a computing device (e.g., the computing device 102c) can display the cast user interface 318.

In some implementations, a display device (e.g., the display device 124) of a computing device (e.g., the computing device 102c) can display the cast user interface 318 in response to a user selecting the cast icon 304. A cast identifier 310 can provide an indication of the content (e.g., news radio) being provided (present, cast, or captured and mirrored) to the external first display device 114 (an external device associated with the name "Living Room") as shown in FIG. 3C.

In some implementations, a user can navigate to a settings interface included on a computing device. The settings interface can include a selection for setting up casting using the computing device and cast-enabled external devices that are near, on the same wired or wireless network, or in communication with the computing device. The cast user interface 318 can include a devices tab 316 (a devices selection). The user can select the devices tab 316 and be provided with the example cast user interface 318. In this example, the cast identifier 310 provides an indication of the content (e.g., news radio) being provided (presented, cast, or captured and mirrored) to an external device associated with the name "Living Room" (e.g., the external first display device 114 shown in FIG. 3C). In some implementations, the cast identifier 310 can allow a user to select, enter, or input an identifier (e.g., a name) for the content they would like to provide (present, cast, or capture and mirror) to the external first display device 114 shown in FIG. 3C.

FIG. 3C is a diagram that shows content provided (presented, casted, or captured and mirrored) by a computing device (e.g., the computing device 102c) to a display device (e.g., the external first display device 114). The content includes visual content 364 (e.g., a grayscale image) and audio content. The visual content 364 is provided (presented, casted, or captured and mirrored) by a computing device (e.g., the computing device 102c) to the first display device 114 for presenting in the display area 150. In addition, audio content is provided (presented, casted, or captured and mirrored) by a computing device (e.g., the computing device 102c) to the first display device 114 for playing on the built-in speakers 126a-b. The computing device (e.g., the computing device 102c) can provide information about the content to the first display device 114. The first display device 114 can show (display) the information as content information 366 and content playing time 368.

FIG. 3D is a diagram that shows an example user interface 320 that can be displayed on a display device (e.g., the display device 124) of a computing device (e.g., the computing device 102c). The example user interface 320 provides a casting indication 322 to the user that a radio station (content) is being provided (presented, cast or captured and mirrored) to an external device associated with the name "Living Room".

FIGS. 4A-C are diagrams that show the setup to launch a cast-enabled application (e.g., the news radio application 302) included on a computing device (e.g., the computing device 102c) when an alarm is triggered on the computing device.

As described herein, a computing device can identify more than one (two or more) external devices for providing (presenting, casting, or capturing and mirroring) content. A unique name can be associated with each identified device. A user can access a cast-enabled application included on a computing device and choose to allow content to be provided (present, cast, or capture and mirror) to a selected identified device.

FIG. 4A is a diagram that shows an example user interface 400 that can be displayed on a display device (e.g., the display device 124) of a computing device (e.g., the computing device 102c). The example user interface 400 provides a casting indication 402 to a user that a photo (content) is currently being provided (presented, cast, or captured and mirrored) to an external device associated with the name "Living Room."

For example, referring to FIGS. 3A-D, the user may have previously interfaced with the news radio application 302 and allowed news radio content to be provided (present, cast, or capture and mirror) to the external device associated with the name "Living Room" (e.g., the first display device 114). Once done viewing and/or listening to the news radio content, the user can interact or interface with the news radio application 302 and pause (stop) the providing (presenting, casting, or capturing and mirroring) of the news radio content to the first display device 114 (e.g., the user can activate a pause control 306). Once the news radio content is no longer being provided to the first display device 114, as shown in FIG. 2B, the computing device 102c can provide (present, cast, or capture and mirror) the content 264 (e.g., a photo by John Doe) to the first display device 114.

Referring back to FIG. 4A, the example user interface 400 includes an alarm setting indication 404. Referring to FIGS. 3A-D, the alarm setting indication 404 provides information to the user that indicates a news radio application (e.g., the news radio application 302) is a cast-enabled application that can be launched (no longer paused or unpaused) when an alarm is triggered on the computing device 102c. In addition, the alarm setting indication 404 provides information to the user that shows when the alarm is scheduled to be triggered (e.g., alarm settings 406). A user can choose to launch (activate, no longer pause (unpause)) the news radio application 302 when the alarm is triggered. For example, referring to FIG. 1, a user can interact with the alarm application 140 and set an alarm to occur at 5:00 am Monday through Friday, as described with reference to FIGS. 2A-C. The alarm setting indication 404 shows the alarm settings 406 that reflect the current settings for an alarm to occur on the computing device 102c. The user can select an alarm icon 408 included in the alarm setting indication 404 that can enable the user to select activation of the news radio application 302 (a cast-enabled application) when the alarm is triggered.

FIG. 4B is a diagram that shows an example user interface 420 that can be displayed on a display device (e.g., the display device 124) of a computing device (e.g., the computing device 102c) that can allow a user to select activation of a cast-enabled application (e.g., the news radio application 302) when an alarm is triggered on the computing device. For example, the user can select a set alarm selection 422.

FIG. 4C is a diagram that shows an example user interface 430 for a cast-enabled application (e.g., the news radio application 302) that provides an alarm confirmation selection 424 that allows a user to confirm the launching, no longer pausing (unpausing), or activation of the news radio application 302 (a cast-enabled application) when the alarm is triggered.

Figure 5B:
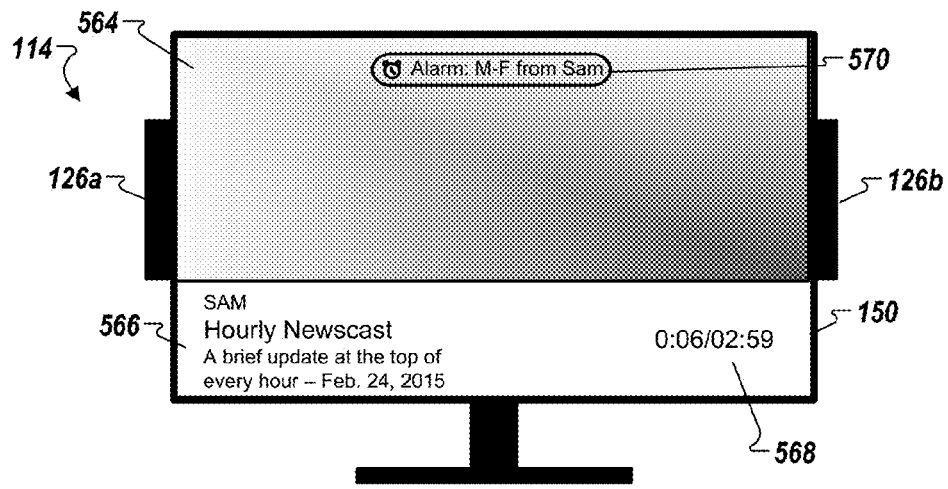
FIG. 5B is a diagram that shows first content provided by a computing device to a display device when an alarm is triggered on the computing device.
Figure 5A:
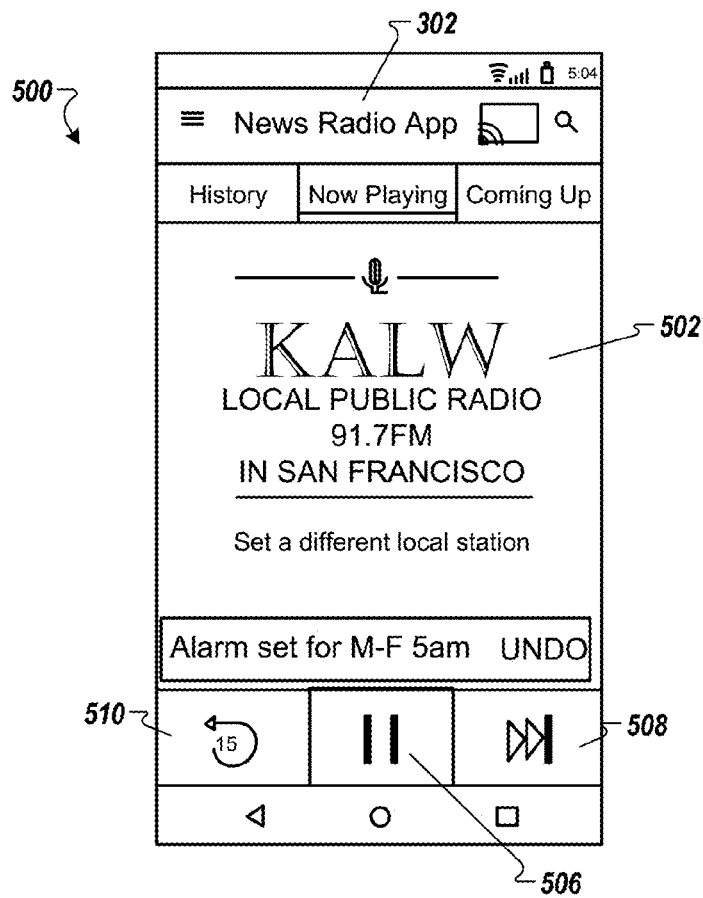
FIG. 5A is a diagram that shows an example user interface that can be displayed on a display device of a computing device when an alarm triggers the launching of a first cast-enabled application.

FIGS. 5A-B are diagrams that show launching (activating, no longer pausing (unpausing)) a cast-enabled application (e.g., the news radio application 302) included on a computing device (e.g., the computing device 102c) that can provide (present, cast, or capture and mirror) content (e.g., news radio) to an external device (e.g., the first display device 114) when an alarm is triggered.

FIG. 5A is a diagram that shows an example user interface 500 that can be displayed on a display device (e.g., the display device 124) of a computing device (e.g., the computing device 102c) when an alarm triggers the launching (activating, unpausing) of a cast-enabled application (e.g., the news radio application 302). The example user interface 500 provides an indication of content (e.g., content indication 502) currently being provided (presented, cast, or captured and mirrored) to an external device (e.g., the first display device 114 as shown in FIG. 5B).

FIG. 5B is a diagram that shows content provided (presented, casted, or captured and mirrored) by a computing device (e.g., the computing device 102c) to a display device (e.g., the external first display device 114) when an alarm is triggered on the computing device. The content includes visual content 564 (e.g., a grayscale image) and audio content. The visual content 564 is provided (presented, casted, or captured and mirrored) by a computing device (e.g., the computing device 102c) to the first display device 114 for presenting in the display area 150. In addition, the audio content is provided (presented, casted, or captured and mirrored) by a computing device (e.g., the computing device 102c) to the first display device 114 for playing on the built-in speakers 126a-b. The computing device (e.g., the computing device 102c) can provide information about the content to the first display device 114. The first display device 114 can show (display) the information as content information 566 and content playing time 568. The first display device 114 can show (display) information about the alarm that, when triggered, launched (activated, unpaused) the cast-enabled application that is now providing content to the first display device 114 (e.g., alarm information 570).

The user can interact with the user interface 500 to pause (e.g., select a pause control 506), fast forward (e.g., select a fast forward control 508), play back (e.g., select a play back control 510) or otherwise control the playing of the content on the first display device 114. In addition or in the alternative, the user can interact with the user interface 500 to set a different radio station or to otherwise change the source of the content being provided (presented, cast, or captured and mirrored) to the first display device 114.

In the example shown in FIG. 1, FIGS. 2A-C, FIGS. 3A-D, FIGS. 4A-C, and FIGS. 5A-B, a user of a computing device (e.g., the computing device 102c) can set an alarm, and enable a cast-enabled application to provide (present, cast, or capture and mirror) content to an external device (e.g., the first display device 114) when the alarm is triggered. In this example, the user can then wake-up listening to news radio.

FIGS. 6A-D are diagrams that show providing (presenting, casting, or capturing and mirroring) of selected content (e.g., TV station) by a computing device (e.g., the computing device 102c) to the external first display device 114.

Figure 6A:
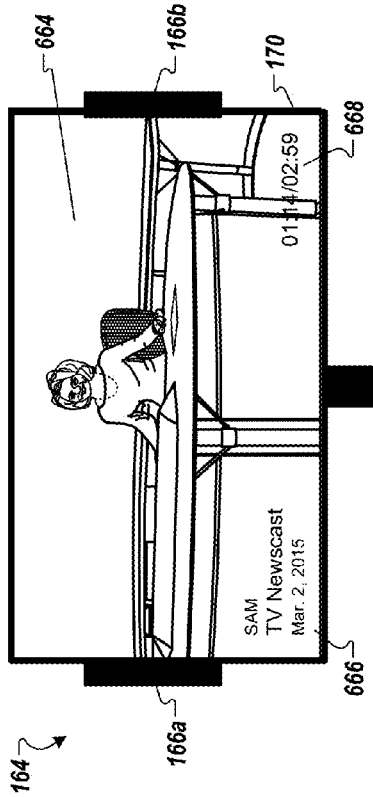
FIG. 6A is a diagram that shows an example user interface for a second cast-enabled application.

FIG. 6A is a diagram that shows an example user interface 600 for a cast-enabled application (e.g., a television application 602). A display device (e.g., the display device 124) of a computing device (e.g., the computing device 102c) can display the user interface 600. For example, referring to FIG. 2A, a user can select a television application icon 208. Selecting the television application icon 208 can launch the television application 602 included on the computing device 102c.

In some implementations, referring to FIG. 1, a user can launch the television application 602 in a tab of a cast-enabled web browser application (e.g., the web browser application 110) included on a computing device (e.g., the computing device 102c). The television application 602 can be a browser-based application that can provide a dedicated user interface (e.g., the user interface 600) for display on the display device 124 in the tab of the cast-enabled web browser application.

The user interface 600 includes a cast icon 604. In implementations where the television application 602 is a browser-based application, a cast icon (similar to the cast icon 604) can be included in a part of the user interface associated with the tab of the browser-based application. A user can select the cast icon 604 in order to provide (present, cast, or capture and mirror) content from the television application 602 to an identified external device (e.g., the first display device 114 as shown in FIG. 6C).

Figure 6B:
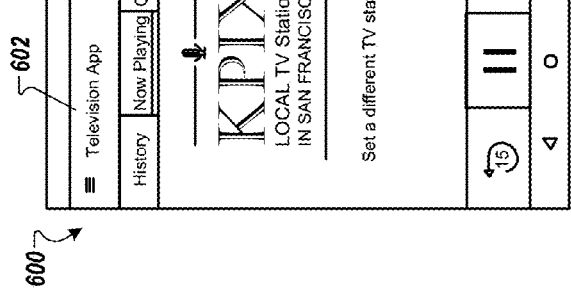
FIG. 6B is a diagram that shows an example second cast user interface that includes a living room indicator, a bedroom indicator, and a kitchen indicator included in a devices tab of the second cast user interface.

FIG. 6B is a diagram that shows an example cast user interface 618 that includes a living room indicator 612, a bedroom indicator 624, and a kitchen indicator 628 included in a devices tab 616 of the cast user interface 618. A display device (e.g., the display device 124) of a computing device (e.g., the computing device 102c) can display the cast user interface 618.

In some implementations, a display device (e.g., the display device 124) of a computing device (e.g., the computing device 102c) can display the cast user interface 618 in response to a user selecting the cast icon 604. A cast identifier 610 can provide an indication of the content (e.g., a television station) being provided (presented, cast, or captured and mirrored) to an external display device (an external device associated with the name "Bed Room") as shown in FIG. 6C. In some implementations, as described with reference to FIGS. 3A-D, a user can navigate to a settings interface included on a computing device to setup casting that uses the computing device and cast-enabled external devices that are near, on the same wired or wireless network, or in communication with the computing device. As shown in FIG. 6B, the living room indicator 612 can provide an indication of other identified external devices for casting (an external device associated with the name "Living Room").

Figure 6C:
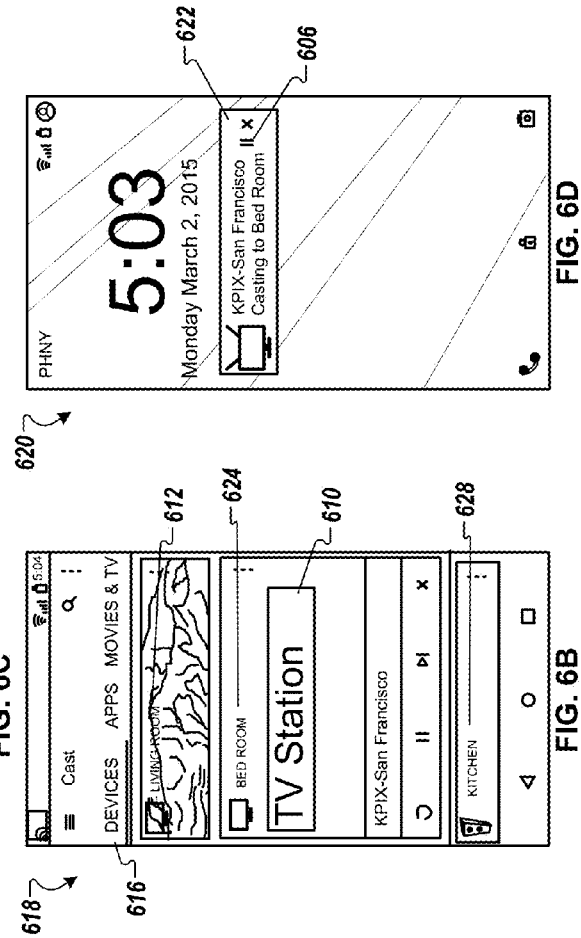
FIG. 6C is a diagram that shows second content provided by a computing device to a display device.

FIG. 6C is a diagram that shows content provided (presented, casted, or captured and mirrored) by a computing device (e.g., the computing device 102c) to the display device 164. The content includes visual content 664 and audio content. The visual content 664 is provided (presented, casted, or captured and mirrored) by a computing device (e.g., the computing device 102c) to the display device 164 for presenting in the display area 170. In addition, audio content is provided (presented, casted, or captured and mirrored) by a computing device (e.g., the computing device 102c) to the display device 164 for playing on built-in speakers 726a-b. The computing device (e.g., the computing device 102c) can provide information about the content to the display device 164. The display device 164 can show (display) the information as content information 666 and content playing time 668.

Figure 6D:
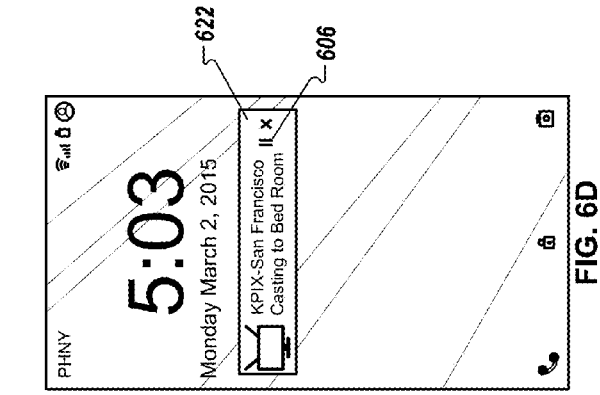
FIG. 6D is a diagram that shows an example user interface that can be displayed on a display device of a computing device, the user interface providing a casting indication to the user that a television station is being provided to a second external device.

FIG. 6D is a diagram that shows an example user interface 620 that can be displayed on a display device (e.g., the display device 124) of a computing device (e.g., the computing device 102c). The example user interface 620 provides a casting indication 622 to the user that a television station (content) is being provided (presented, cast, or captured and mirrored) to an external device associated with the name "Bed Room".

Figure 7C:
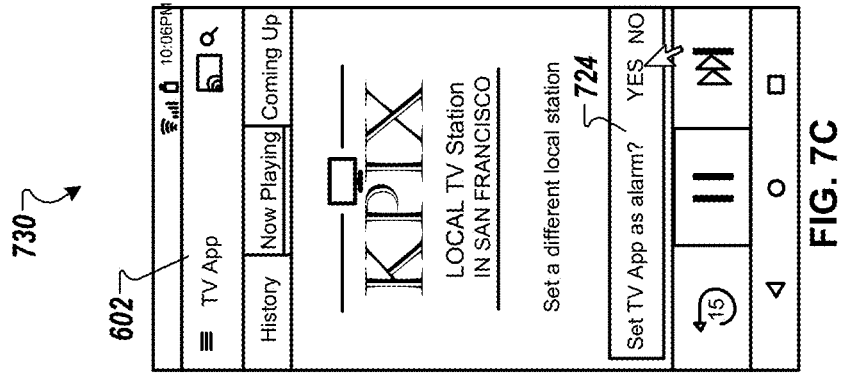
FIG. 7C is a diagram that shows an example user interface for a second cast-enabled application that provides an alarm confirmation selection that allows a user to confirm the launching, unpausing, or activation of the second cast-enabled application when an alarm is triggered on a computing device.
Figure 7B:
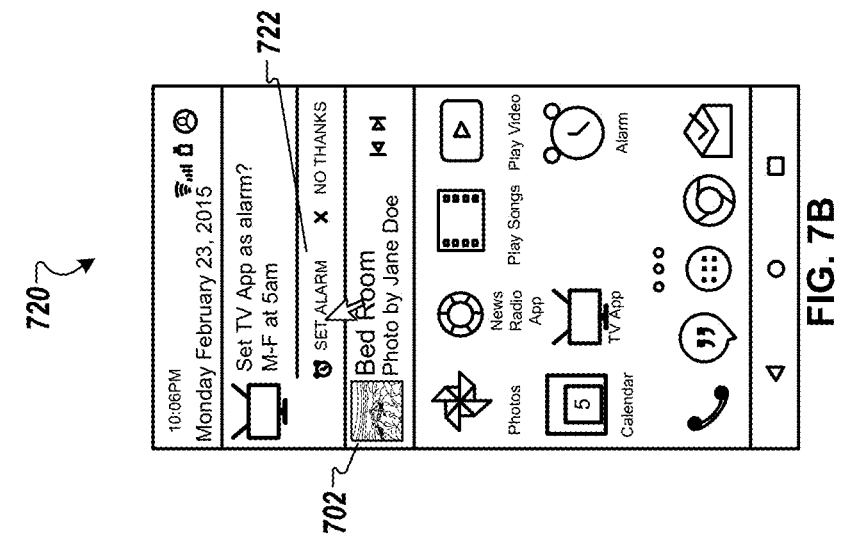
FIG. 7B is a diagram that shows an example user interface that can be displayed on a display device of a computing device that can allow a user to select activation of a second cast-enabled application when an alarm is triggered on the computing device.
Figure 7A:
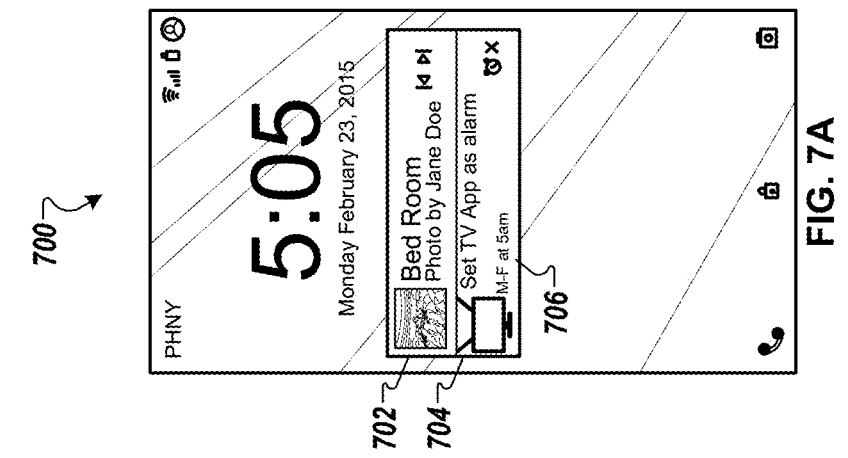
FIG. 7A is a diagram that shows an example user interface that can be displayed on a display device of a computing device, the user interface providing a casting indication to the user that a photo is being provided to a second external device.

FIGS. 7A-C are diagrams that show the setup to launch a cast-enabled application (e.g., the television application 602) included on a computing device (e.g., the computing device 102c) when an alarm is triggered on the computing device.

As described herein, a computing device can identify more than one (two or more) external devices for providing (presenting, casting, or capturing and mirroring) content. A unique name can be associated with each identified device. A user can access a cast-enabled application included on a computing device and choose to allow content to be provided (present, cast, or capture and mirror) to a selected identified device.

FIG. 7A is a diagram that shows an example user interface 700 that can be displayed on a display device (e.g., the display device 124) of a computing device (e.g., the computing device 102c). The example user interface 700 provides a casting indication 702 to a user that a photo (content) is currently being provided (presented, cast, or captured and mirrored) to an external device associated with the name "Bed Room."

For example, referring to FIGS. 6A-D, the user may have previously interfaced with the television application 602 and allowed television content to be provided (present, cast, or capture and mirror) to the external device associated with the name "Bed Room" (e.g., the second display device 164). Once done viewing and/or listening to the television content, the user can interact or interface with the television application 602 and pause (stop) the providing (presenting, casting, or capturing and mirroring) of the television content to the second display device 164 (e.g., the user can activate a pause control 606). Once the television content is no longer being provided to the second display device 164, the computing device 102c can provide (present, cast, or capture and mirror) content (e.g., a photo by John Doe) to the second display device 164 in a similar manner as content 264 is provided to the first display device 114 as shown in FIG. 2B.

Referring back to FIG. 7A, the example user interface 700 includes an alarm setting indication 704. Referring to FIGS. 6A-D, the alarm setting indication 704 provides information to the user that indicates a television application (e.g., the television application 602) can be launched (no longer paused or unpaused) when an alarm is triggered on the computing device 102c. As described, the television application 602 can be a cast-enabled application or an application running in a tab of a cast-enabled web browser application 110.

In addition, the alarm setting indication 704 provides information to the user that shows when the alarm is scheduled to be triggered (e.g., alarm settings 706). A user can choose to launch (activate, no longer pause (unpause)) the television application 602 when the alarm is triggered.

FIG. 7B is a diagram that shows an example user interface 720 that can be displayed on a display device (e.g., the display device 124) of a computing device (e.g., the computing device 102c) that can allow a user to select activation of the television application 602 when an alarm is triggered on the computing device. For example, the user can select a set alarm selection 722.

FIG. 7C is a diagram that shows an example user interface 730 for the television application 602 that provides an alarm confirmation selection 724 that allows a user to confirm the launching, no longer pausing (unpausing), or activation of the television application 602 when the alarm is triggered.

Figure 8B:
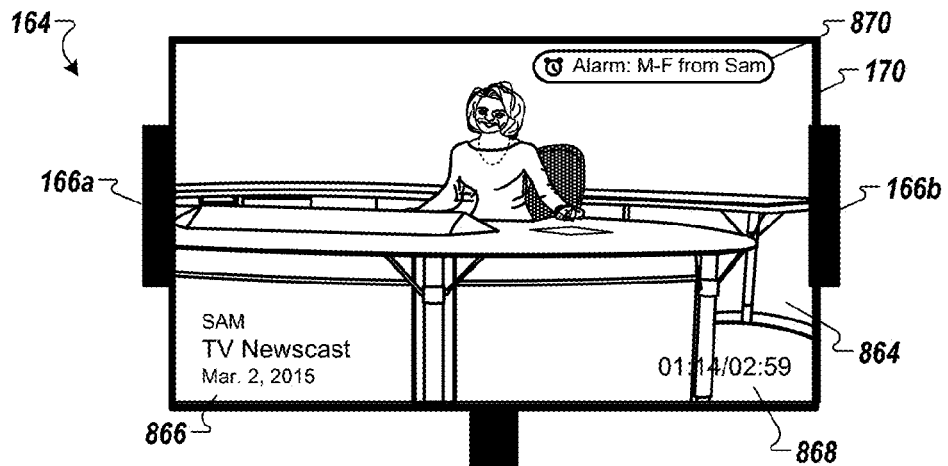
FIG. 8B is a diagram that shows second content provided by a computing device to a display device when an alarm is triggered on the computing device.
Figure 8A:
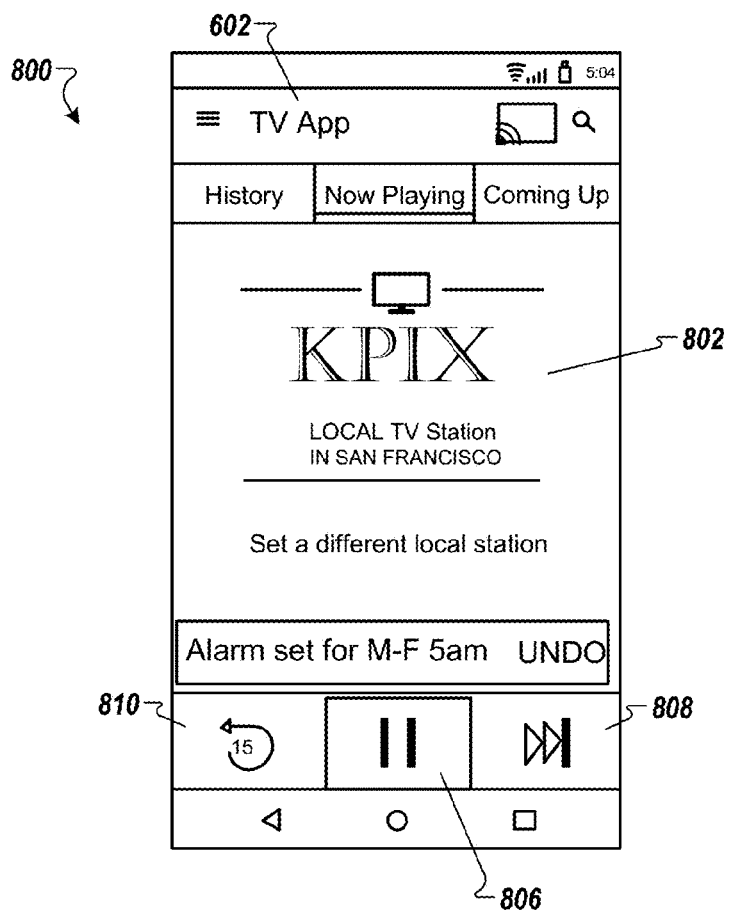
FIG. 8A is a diagram that shows an example user interface that can be displayed on a display device of a computing device when an alarm triggers the launching of a second cast-enabled application.

FIGS. 8A-B are diagrams that show launching (activating, no longer pausing (unpausing)) the television application 602 that can provide (present, cast, or capture and mirror) content (e.g., a television news broadcast) to an external device (e.g., the second display device 164) when an alarm is triggered.

FIG. 8A is a diagram that shows an example user interface 800 that can be displayed on a display device (e.g., the display device 124) of a computing device (e.g., the computing device 102c) when an alarm triggers the launching (activating, unpausing) of the television application 602. The example user interface 800 provides an indication of content (e.g., content indication 802) currently being provided (presented, cast, or captured and mirrored) to an external device (e.g., the second display device 164 as shown in FIG. 1 and FIG. 8B).

FIG. 8B is a diagram that shows content provided (presented, casted, or captured and mirrored) by a computing device (e.g., the computing device 102c) to a display device (e.g., the second display device 164) when an alarm is triggered on the computing device. The content includes visual content 864 and audio content. The visual content 864 is provided (presented, casted, or captured and mirrored) by a computing device (e.g., the computing device 102c) to the second display device 164 for presenting in the display area 170. In addition, the audio content is provided (presented, casted, or captured and mirrored) by a computing device (e.g., the computing device 102c) to the second display device 164 for playing on the built-in speakers 166a-b. The computing device (e.g., the computing device 102c) can provide information about the content to the second display device 164. The second display device 164 can show (display) the information as content information 866 and content playing time 868. The second display device 164 can show (display) information about the alarm that, when triggered, launched (activated, unpaused) the cast-enabled application that is now providing content to the second display device 164 (e.g., alarm information 870).

The user can interact with the user interface 800 to pause (e.g., select a pause control 806), fast forward (e.g., select a fast forward control 808), play back (e.g., select a play back control 810) or otherwise control the displaying and playing of the content on the second display device 164. In addition or in the alternative, the user can interact with the user interface 800 to set a different television station or to otherwise change the source of the content being provided (presented, cast, or captured and mirrored) to the second display device 164.

Figure 9A:
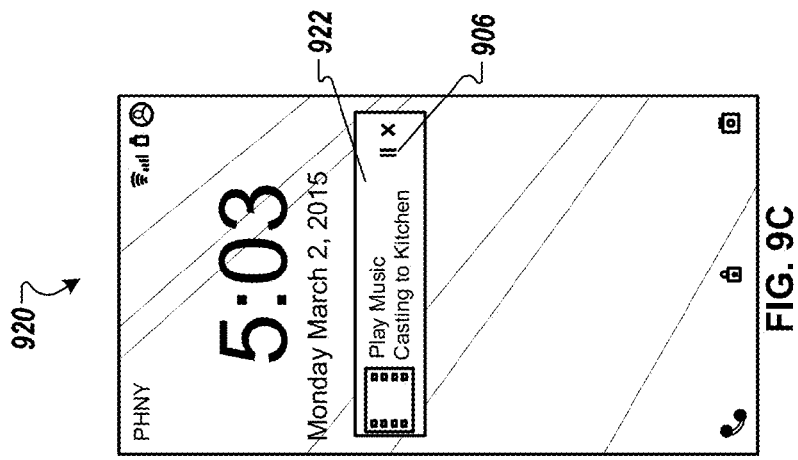
FIG. 9A is a diagram that shows an example user interface for a third cast-enabled application.
Figure 9B:
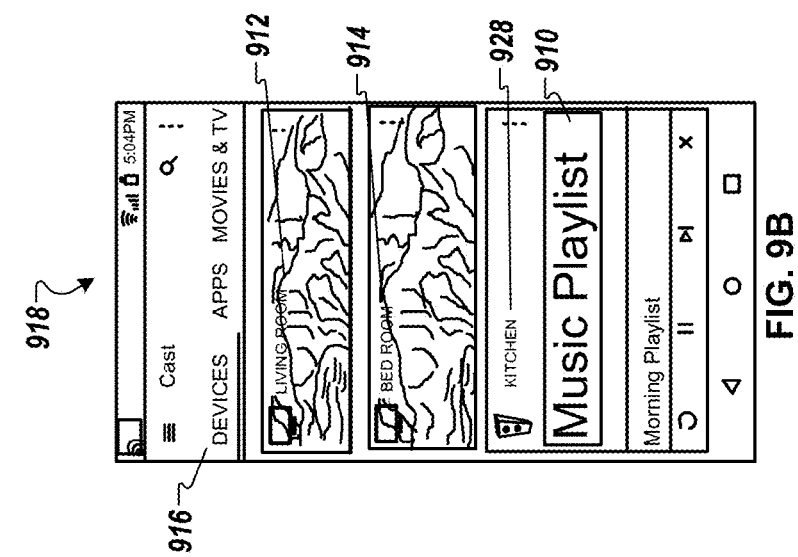
FIG. 9B is a diagram that shows an example third cast user interface that includes a living room indicator, a bedroom indicator, and a kitchen indicator included in a devices tab of the third cast user interface.
Figure 9C:
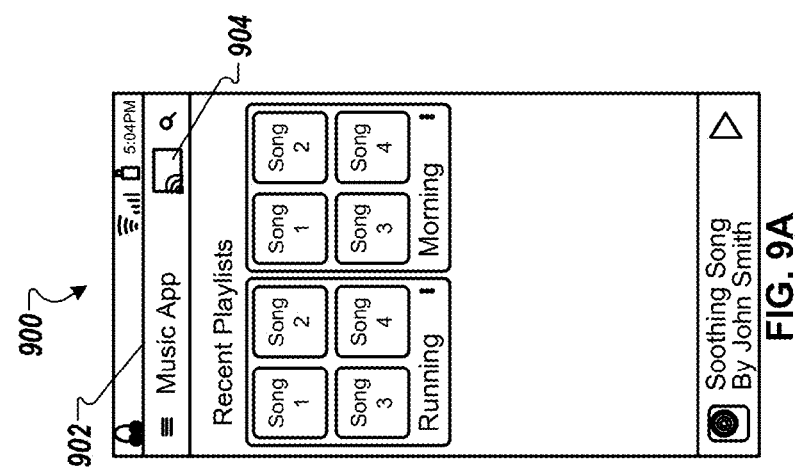
FIG. 9C is a diagram that shows an example user interface that can be displayed on a display device of a computing device, the user interface providing a casting indication to the user that a music is being provided to a third external device.

FIGS. 9A-C are diagrams that show providing (presenting, casting, or capturing and mirroring) of selected content (e.g., a music playlist) by a computing device (e.g., the computing device 102c as shown in FIG. 1) to a speaker (e.g., the speaker 118 as shown in FIG. 1).

FIG. 9A is a diagram that shows an example user interface 900 for a cast-enabled application (e.g., a music application 902). Referring to FIG. 1, a display device (e.g., the display device 124) of a computing device (e.g., the computing device 102c) can display the user interface 900. For example, referring to FIG. 2A, a user can select a music application icon 210. Selecting the music application icon 210 can launch the music application 902 included on the computing device 102c.

The user interface 900 includes a cast icon 904. A user can select the cast icon 904 in order to provide (present, cast, or capture and mirror) content from the music application 902 to an identified external device.

FIG. 9B is a diagram that shows an example cast user interface 918 that includes a living room indicator 912, a bedroom indicator 914, and a kitchen indicator 928 included in a devices tab 916 of the cast user interface 918. A display device (e.g., the display device 124) of a computing device (e.g., the computing device 102c) can display the cast user interface 918.

As described with reference to FIGS. 3A-D, in some implementations, a the display device 124 of the computing device 102c can display the cast user interface 918 in response to a user selecting the cast icon 904. A cast identifier 910 can provide an indication of the content (e.g., a music playlist) being provided (presented, cast, or captured and mirrored) to the speaker 118 (an external device associated with the name "Kitchen") as shown in FIG. 9C.

As described herein, in some implementations, a user can navigate to a settings interface included on a computing device for setting up casting using the computing device and cast-enabled external devices that are near, on the same wired or wireless network, or in communication with the computing device. In some implementations, the cast identifier 910 can allow a user to select, enter, or input an identifier (e.g., a name) for the content they would like to provide (present, cast, or capture and mirror) to the speaker 118. A computing device (e.g., the computing device 102c) can provide (present, cast, or capture and mirror) content (e.g., audio content) to a speaker (e.g., the speaker 118).

FIG. 9C is a diagram that shows an example user interface 920 that can be displayed on a display device (e.g., the display device 124) of a computing device (e.g., the computing device 102c). The example user interface 920 provides a casting indication 922 to the user that a music from a music application (e.g., a music playlist) (content) is being provided (presented, cast, or captured and mirrored) to an external device associated with the name "Kitchen".

FIG. 10A is a diagram that shows an example user interface 1000 that can be displayed on a display device (e.g., the display device 124) of a computing device (e.g., the computing device 102c). The example user interface 1000 provides a casting indication 1002 to a user that an external device associated with the name "Kitchen" is available for casting.

For example, referring to FIGS. 9A-C, the user may have previously interfaced with the music application 902 and allowed content (e.g., music, streaming audio content, a playlist of one or more songs) to be provided (present, cast, or capture and mirror) to the external device associated with the name "Kitchen" (e.g., the speaker 118). Once done listening to the content, the user can interact or interface with the music application 902 and pause (stop) the providing (presenting, casting, or capturing and mirroring) of the content to the speaker 118 (e.g., the user can activate a pause control 906).

Referring back to FIG. 10A, the example user interface 1000 includes an alarm setting indication 1004. Referring to FIGS. 9A-C, the alarm setting indication 1004 provides information to the user that indicates a music application (e.g., the music application 902) is a cast-enabled application that can be launched (no longer paused or unpaused) when an alarm is triggered on the computing device 102c. In addition, the alarm setting indication 1004 provides information to the user that shows when the alarm is scheduled to be triggered (e.g., alarm settings 1006). A user can choose to launch (activate, no longer pause (unpause)) the music application 902 when the alarm is triggered. For example, referring to FIG. 1, a user can interact with the alarm application 140 and set an alarm to occur at 5:00 am Monday through Friday, as described with reference to FIGS. 2A-C. The alarm setting indication 1004 shows the alarm settings 1006 that reflect the current settings for an alarm to occur on the computing device 102c. The user can select an alarm icon 1008 included in the alarm setting indication 1004 that can enable the user to select activation of the music application 902 (a cast-enabled application) when the alarm is triggered.

FIG. 10B is a diagram that shows an example user interface 1020 that can be displayed on a display device (e.g., the display device 124) of a computing device (e.g., the computing device 102c) that can allow a user to select activation of the music application 902 when an alarm is triggered on the computing device. For example, the user can select a set alarm selection 1022.

FIG. 10C is a diagram that shows an example user interface 1030 for the music application 902 that provides an alarm confirmation selection 1024 that allows a user to confirm the launching, no longer pausing (unpausing), or activation of the music application 902 when the alarm is triggered.

Figure 11:
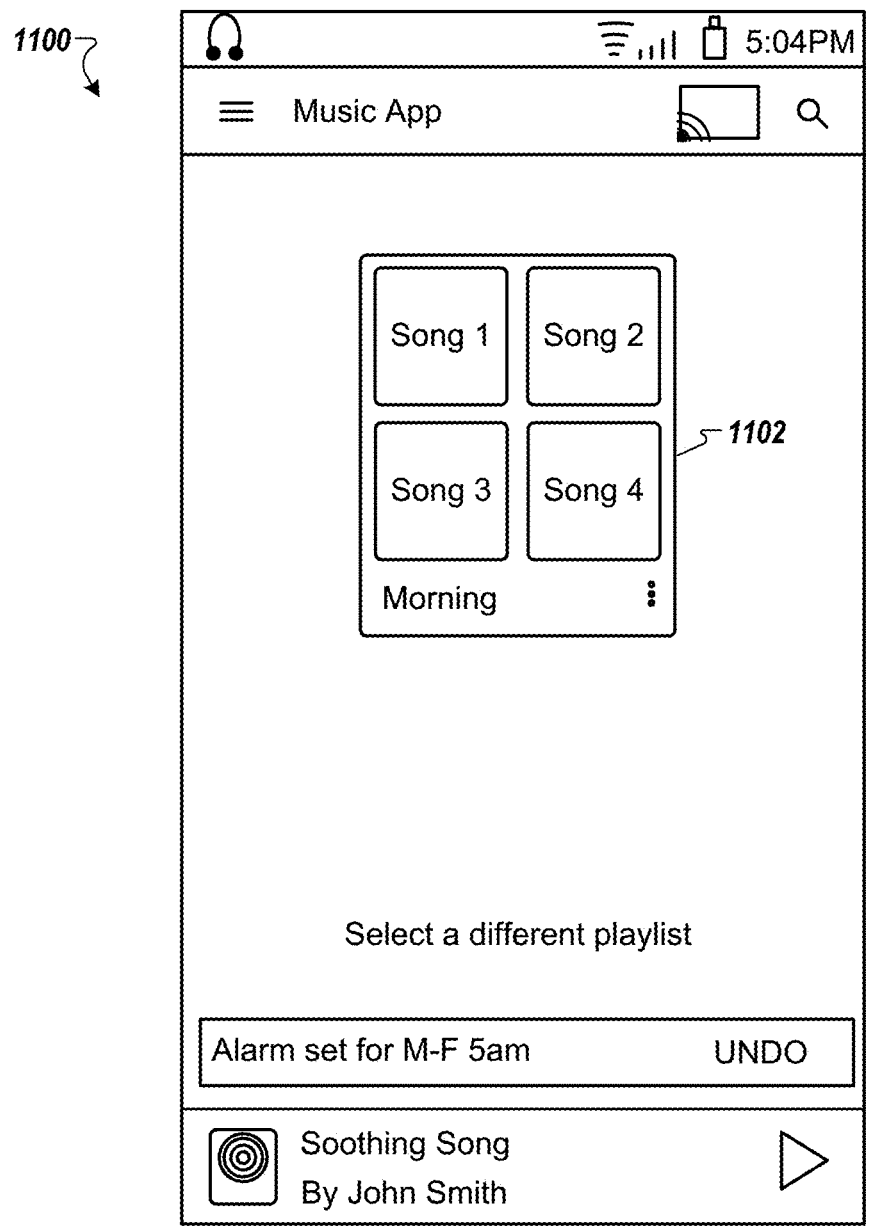
FIG. 11 is a diagram that shows an example user interface that can be displayed on a display device of a computing device when an alarm triggers the launching of a third cast-enabled application.

FIG. 11 is a diagram that shows an example user interface 1100 that can be displayed on a display device (e.g., the display device 124) of a computing device (e.g., the computing device 102c) when an alarm triggers the launching (activating, unpausing) of the music application 902. The example user interface 1100 provides an indication of content (e.g., content indication 1102) currently being provided (presented, cast, or captured and mirrored) to an external device (e.g., the speaker 118).

A user may rely on an alarm set on a computing device to properly trigger at the day and time set by the user in order to wake up the user and/or otherwise alert the user. If for some reason the alarm does not trigger, the user may miss an important event or appointment. It is therefore desirable to have a backup to the alarm so that if the alarm does not trigger, a backup to the alarm will activate and, at least, alert the user.

In many of the implementations described herein, referring to FIG. 1 and FIGS. 2A-C, a user can set an alarm on a computing device (e.g., the computing device 102c) to trigger at a particular day and time (e.g., referring to FIG. 2C at 5:00 am Monday through Friday every week). In addition, the alarm type 230 (e.g., "sound") and the alarm tone 232 (e.g., "morning flower") set by the user can be used in addition to, as an alternate to, or as a backup to the other events that can be scheduled to occur when the alarm is triggered. If the other scheduled event(s) do not occur, as a backup (or default condition), the alarm application on the computing device can play (sound) the alarm tone (morning flower) on the computing device when the alarm is triggered.

For example, referring to FIGS. 3A-D, 4A-C, 5A-B, 6A-D, 7A-C, 8A-B, 9A-C, and 10A-C, if the selected application for launching when the alarm is triggered is no longer available for use by the computing device (e.g., the computing device 102c), when the alarm is triggered, the alarm application can play the alarm tone when the alarm is triggered. In addition or in the alternative, the computing device can provide another or additional audio and/or visual indication on the computing device when the alarm is triggered. For example, the selected application may no longer be installed on the computing device 102c. In another example, the selected application may be a web-based application. In this case, the computing device 102c, at the time the alarm is triggered, may not be connected to the network 116 and may not have access to the web-based application.

For example, referring to FIGS. 1, 3A-D, 4A-C, 5A-B, 6A-D, 7A-C, 8A-B, 9A-C, and 10A-C, when the alarm is triggered, one or more external devices selected to receive content when the alarm triggers may not be operable or detected by the computing device executing the alarm application. For example, the alarm application 140 can trigger an alarm as set by the user. Based on the triggering of the alarm, the user may have setup alarm settings on one or more applications included on the computing device 102c such that when the alarm is triggered the application will be launched. The launched application can provide (present, cast, or capture and mirror) content to an identified external device. The identified external device may not be detected when the alarm is triggered and the application is launched. For example, the alarm application can receive an error message from the launched application indicating that the identified external device was not detected (e.g., the external device may be offline and no longer connected to the network 116). In this case, the launched application may not provide (present, cast, or capture and mirror) the content to the identified external device. In some cases, as a backup or fallback position, the launched application may provide the computing device 102c with the content for rendering on the computing device 102c. For example, the computing device 102c can display visual content on the display device 124 and/or play audio content on the microphone/speaker 158.

In some implementations, the computing device (e.g., the computing device 102c) can determine if content provided (presented, cast, or captured and mirrored) to an external device (e.g., the first display device 114) when an alarm is triggered is actually rendered on the external device. For example, the computing device 102c can listen to the audio portion of the content rendered on the first display device 114. The microphone/speaker 158 can listen to the audio output of the built-in speakers 126a-b. If the computing device 102c detects no audio when (or very soon after) the alarm is triggered by the alarm application 140, as a backup or fallback position, the alarm application 140 can play the alarm tone when the alarm is triggered.

Referring to FIG. 1, audio content (e.g., music) can be provided (presented, cast, or captured and mirrored) to the first display device 114, the second display device 164, and/or the speaker 118. The first display device 114 can play the audio content on the built-in speakers 126a-b. The second display device 164 can play the audio content on the built-in speakers 166a-b. In some cases, the audio content can include video content (e.g., a picture) for display in a display area (e.g., the display area 150) of a first display device (e.g., the first display device 114). In some cases, the audio content can include video content (e.g., a picture) for display in a display area (e.g., the display area 170) of a second display device (e.g., the second display device 164).

Streaming media (video and audio content (e.g., a television show, a movie) can be provided (presented, cast, or captured and mirrored) to the first display device 114, the second display device 164, and/or the speaker 118. In this case, the speaker 118 can play the audio content of the streaming media.

Figure 12:
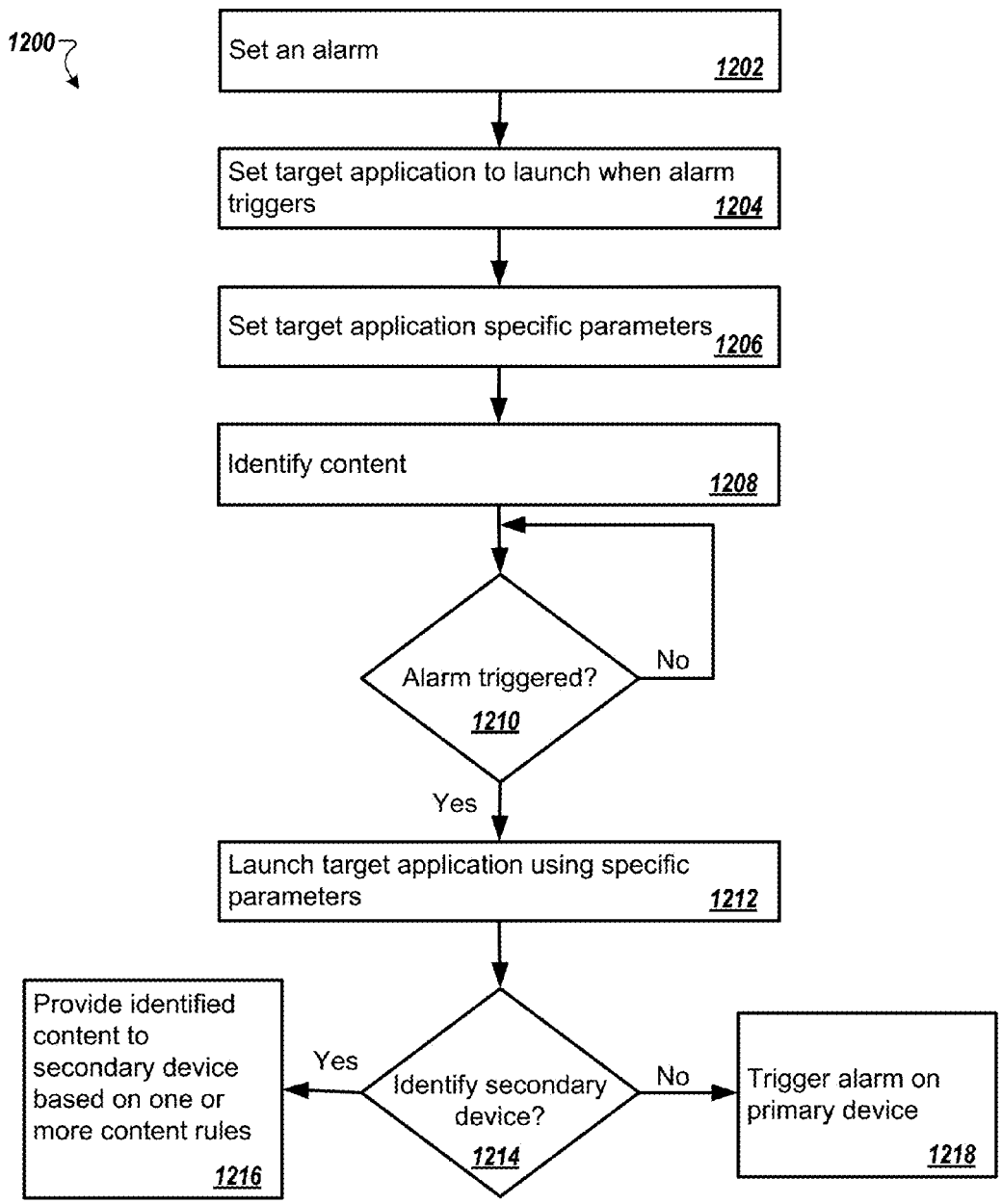
FIG. 12 is a flowchart that illustrates a method for launching an application on a computing device and providing content to an external display device when an alarm is triggered on the computing device.

FIG. 12 is a flowchart that illustrates a method 1200 for launching an application on a first computing device and providing (presenting, casting, or capturing and mirroring) content to an external display device when an alarm is triggered on the first computing device. In some implementations, the systems described herein can implement the method 1200. For example, the method 1200 can be described referring to FIGS. 1, 2A-C, 3A-D, 4A-C, 5A-B, 6A-D, 7A-C, 8A-B, 9A-C, 10A-C, and 11A-B.

An alarm is set (block 1202). For example, referring to FIG. 1 and FIGS. 2A-C, a user can interact with the alarm user interface 220 to set a time and day when the alarm will be triggered. In addition, the user can set the alarm type 230 and the alarm tone 232. A target application to launch when the alarm triggers is set (block 1204). For example, referring to FIGS. 4A-C, the news radio application 302 is set to be launched when the alarm is triggered. Target application specific parameters are set (block 1206). For example, referring to FIGS. 4A-C, when the alarm is triggered the radio station as shown in the current station indication 332 is set to be played. In some cases, the user can select the set station selection 334 to select a different radio station to be played when the alarm is triggered.

Content for providing (presenting, casting, or capturing and mirroring) is identified (block 1208). For example, the news radio application 302 can provide (present, cast, or capture and mirror) the content of the radio station as shown in the current station indication 332 when the alarm is triggered to an identified secondary device.

The method 1200 waits until the alarm is triggered. If it is determined that the alarm is triggered (block 1210), the target application is launched using the specific parameters (block 1212). In some implementations, when the alarm application triggers the alarm, the alarm application can then launch the target application. In some implementations, an alarm built into (included in) the target application can trigger and start the further execution of the target application. For example, the news radio application 302 is launched, playing the radio station as indicated in the current station indication 332. If it is determined that a secondary device is identified (block 1214), the identified content can be provided to the secondary device based on one or more content rules (block 1216). For example, the first display device 114 is identified by the computing device 102c. The content from the radio station is provided to the first display device 114. The content can include the visual content 564 and audio content. The visual content 564 is provided (presented, casted, or captured and mirrored) by the computing device 102c to the first display device 114 for presenting in the display area 150. In addition, the audio content is provided (presented, casted, or captured and mirrored) by the computing device 102c to the first display device 114 for playing on the built-in speakers 126a-b. If it is determined that a secondary device is not identified (block 1214), an alarm can be triggered on the primary device (block 1218) as a backup or fall-back position as described herein.

Figure 13:
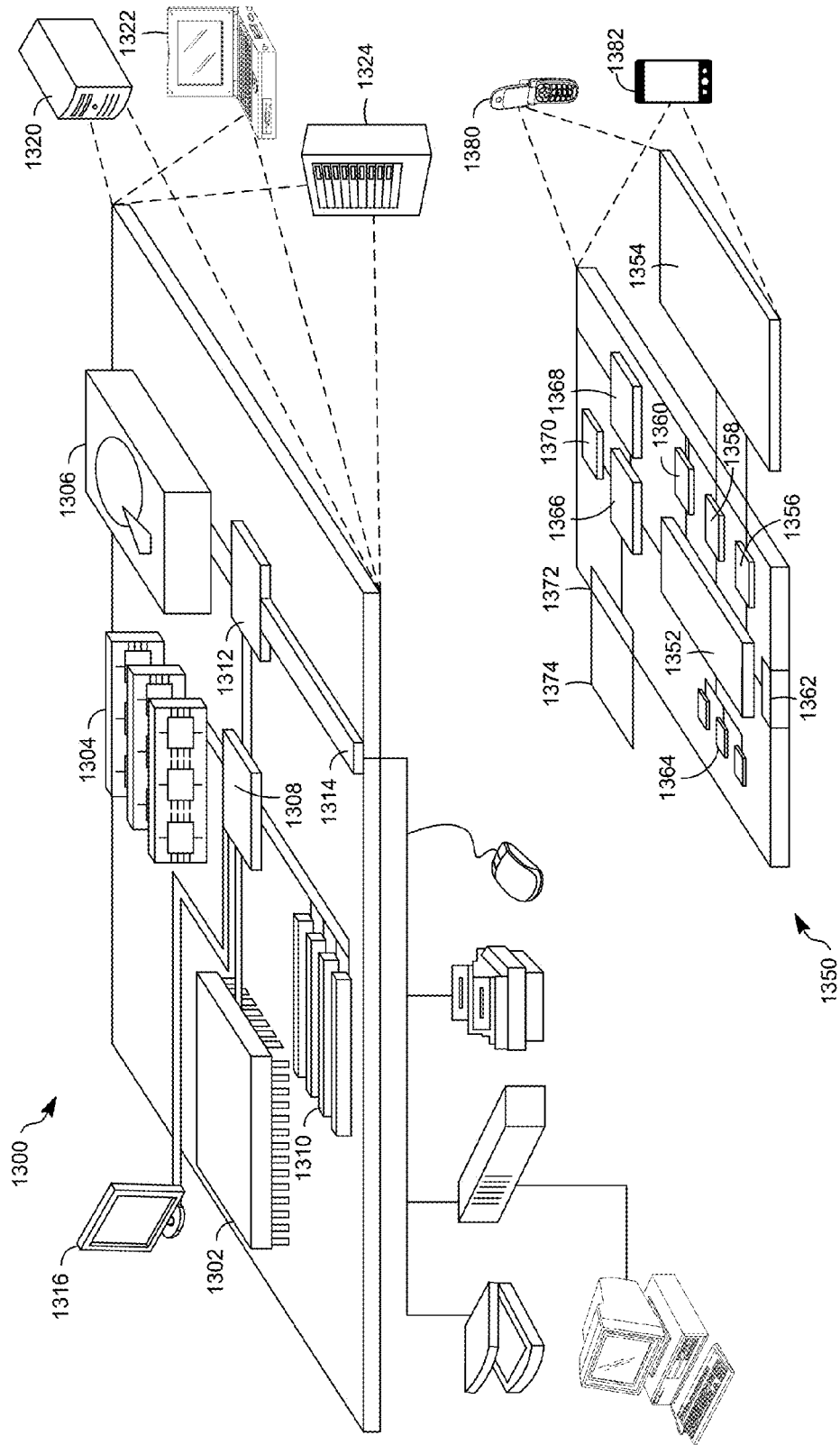
FIG. 13 shows an example of a computer device and a mobile computer device that can be used to implement the techniques described here.

FIG. 13 shows an example of a generic computer device 1300 and a generic mobile computer device 1350, which may be used with the techniques described here. Computing device 1300 is intended to represent various forms of digital computers, such as laptops, desktops, workstations, personal digital assistants, servers, blade servers, mainframes, and other appropriate computers. Computing device 1350 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1300 includes a processor 1302, memory 1304, a storage device 1306, a high-speed interface 1308 connecting to memory 1304 and high-speed expansion ports 1310, and a low speed interface 1312 connecting to low speed bus 1314 and storage device 1306. Each of the components 1302, 1304, 1306, 1308, 1310, and 1312, are interconnected using various busses, and may be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as display 1316 coupled to high speed interface 1308. In other implementations, multiple processors and/or multiple buses may be used, as appropriate, along with multiple memories and types of memory. Also, multiple computing devices 1300 may be connected, with each device providing portions of the necessary operations (e.g., as a server bank, a group of blade servers, or a multi-processor system).

The memory 1304 stores information within the computing device 1300. In one implementation, the memory 1304 is a volatile memory unit or units. In another implementation, the memory 1304 is a non-volatile memory unit or units. The memory 1304 may also be another form of computer-readable medium, such as a magnetic or optical disk.

The storage device 1306 is capable of providing mass storage for the computing device 1300. In one implementation, the storage device 1306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1304, the storage device 1306, or memory on processor 1302.

The high speed controller 1308 manages bandwidth-intensive operations for the computing device 1300, while the low speed controller 1312 manages lower bandwidth-intensive operations. Such allocation of functions is exemplary only. In one implementation, the high-speed controller 1308 is coupled to memory 1304, display 1316 (e.g., through a graphics processor or accelerator), and to high-speed expansion ports 1310, which may accept various expansion cards (not shown). In the implementation, low-speed controller 1312 is coupled to storage device 1306 and low-speed expansion port 1314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1300 may be implemented in a number of different forms, as shown in the figure. For example, it may be implemented as a standard server 1320, or multiple times in a group of such servers. It may also be implemented as part of a rack server system 1324. In addition, it may be implemented in a personal computer such as a laptop computer 1322. Alternatively, components from computing device 1300 may be combined with other components in a mobile device (not shown), such as device 1350. Each of such devices may contain one or more of computing device 1300, 1350, and an entire system may be made up of multiple computing devices 1300, 1350 communicating with each other.

Computing device 1350 includes a processor 1352, memory 1364, an input/output device such as a display 1354, a communication interface 1366, and a transceiver 1368, among other components. The device 1350 may also be provided with a storage device, such as a microdrive or other device, to provide additional storage. Each of the components 1350, 1352, 1364, 1354, 1366, and 1368, are interconnected using various buses, and several of the components may be mounted on a common motherboard or in other manners as appropriate.

The processor 1352 can execute instructions within the computing device 1350, including instructions stored in the memory 1364. The processor may be implemented as a chipset of chips that include separate and multiple analog and digital processors. The processor may provide, for example, for coordination of the other components of the device 1350, such as control of user interfaces, applications run by device 1350, and wireless communication by device 1350.

Processor 1352 may communicate with a user through control interface 1358 and display interface 1356 coupled to a display 1354. The display 1354 may be, for example, a TFT LCD (Thin-Film-Transistor Liquid Crystal Display) or an OLED (Organic Light Emitting Diode) display, or other appropriate display technology. The display interface 1356 may comprise appropriate circuitry for driving the display 1354 to present graphical and other information to a user. The control interface 1358 may receive commands from a user and convert them for submission to the processor 1352. In addition, an external interface 1362 may be provide in communication with processor 1352, so as to enable near area communication of device 1350 with other devices. External interface 1362 may provide, for example, for wired communication in some implementations, or for wireless communication in other implementations, and multiple interfaces may also be used.

The memory 1364 stores information within the computing device 1350. The memory 1364 can be implemented as one or more of a computer-readable medium or media, a volatile memory unit or units, or a non-volatile memory unit or units. Expansion memory 1374 may also be provided and connected to device 1350 through expansion interface 1372, which may include, for example, a SIMM (Single In Line Memory Module) card interface. Such expansion memory 1374 may provide extra storage space for device 1350, or may also store applications or other information for device 1350. Specifically, expansion memory 1374 may include instructions to carry out or supplement the processes described above, and may include secure information also. Thus, for example, expansion memory 1374 may be provide as a security module for device 1350, and may be programmed with instructions that permit secure use of device 1350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1364, expansion memory 1374, or memory on processor 1352, that may be received, for example, over transceiver 1368 or external interface 1362.

Device 1350 may communicate wirelessly through communication interface 1366, which may include digital signal processing circuitry where necessary. Communication interface 1366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1368. In addition, short-range communication may occur, such as using a Bluetooth, WiFi, or other such transceiver (not shown). In addition, GPS (Global Positioning System) receiver module 1370 may provide additional navigation- and location-related wireless data to device 1350, which may be used as appropriate by applications running on device 1350.

Device 1350 may also communicate audibly using audio codec 1360, which may receive spoken information from a user and convert it to usable digital information. Audio codec 1360 may likewise generate audible sound for a user, such as through a speaker, e.g., in a handset of device 1350. Such sound may include sound from voice telephone calls, may include recorded sound (e.g., voice messages, music files, etc.) and may also include sound generated by applications operating on device 1350.

The computing device 1350 may be implemented in a number of different forms, as shown in the figure. For example, it may be implemented as a cellular telephone 1380. It may also be implemented as part of a smart phone 1382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In situations in which the systems and methods discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
    setting an alarm on a computing device, the setting including:
        setting a predetermined time to trigger the alarm;
        receiving, in a user interface displayed on a display device included in the computing device, a selection of a television application for launching when the alarm is triggered; and
        identifying content for access by the television application when the television application is launched;
    launching the television application based on the triggering of the alarm;
    identifying an external device for execution of the identified content; and
    providing the identified content for execution on the external device.

2. The method of claim 1,
    wherein the computing device and the external device are connected to the same network;
    wherein the computing device includes a mobile computing device in communication with a computer system by way of the network, and
    wherein the external device includes a display device in communication with the computer system by way of the network.

3. The method of claim 2, wherein the content includes streaming media being provided by the computer system, the streaming media including video and audio content, the video content for display in a display area of the display device included in the external device and the audio content for playing on speakers included in the display device included in the external device.

4. The method of claim 1,
    wherein the computing device and the external device are connected to the same network;
    wherein the computing device includes a mobile computing device in communication with a computer system by way of a network, and
    wherein the external device includes at least one speaker, the at least one speaker in communication with the computer system by way of the network.

5. The method of claim 4, wherein the content includes streaming audio content being provided by the computer system for playing on the at least one speaker.

6. The method of claim 1, wherein the setting of the alarm is performed by an alarm application executing on the computing device.

7. The method of claim 1,
    wherein identifying content for access by the television application when launched includes identifying a specific intent for capture by the television application, and
    wherein launching the television application based on the triggering of the alarm includes capturing, by the television application, the specific intent.

8. The method of claim 1,
    wherein identifying content for access by the television application when launched includes identifying application specific parameters, and
    wherein launching the television application based on the triggering of the alarm includes providing the application specific parameters to the television application.

9. The method of claim 8,
    wherein the setting of the alarm is performed by an alarm application executing on the computing device, and
    wherein the application specific parameters are set in the alarm application.

10. The method of claim 8, wherein the application specific parameters are set in a settings application executing on the computing device.

11. The method of claim 8, wherein the application specific parameters are determined by a user.

12. The method of claim 8, wherein the application specific parameters are based on user interactions with the television application on the computing device.

13. A non-transitory, machine-readable medium having instructions stored thereon, the instructions, when executed by a processor, cause a computing device to:
    set an alarm on a computing device, the alarm set to trigger at a predetermined time;
    launch a cast-enabled application on the computing device based on the triggering of the alarm at the predetermined time;
    receive, in a user interface displayed on a display device included in the computing device, a selection of an external device for execution of particular content accessible by the cast-enabled application, the computing device and the external device being connected to a network; and
    control providing of the particular content by a computer system connected to the network and for execution on the external device, the particular content including streaming media including audio content and video content.

14. The medium of claim 13,
    wherein the computing device includes a mobile computing device in communication with the computer system by way of the network,
    wherein the external device includes a display device in communication with the computer system by way of the network,
    wherein the video content is for display in a display area of the display device included in the external device, and wherein the audio content is for playing on speakers included in the display device included in the external device.

15. The medium of claim 13,
wherein the computing device includes a mobile computing device in communication with the computer system by way of the network,
wherein the external device includes at least one speaker, the at least one speaker in communication with the computer system by way of the network, and
wherein the streaming audio content is for playing on the at least one speaker.

16. A system comprising:
a network;
a computer system including a content repository, the computer system in communication with the network;
a computing device in communication with the network, the computing device including a cast-enabled application and an alarm application,
the alarm application configured to:
set an alarm to trigger at a predetermined time; and
indicate that the cast-enabled application be launched when the alarm is triggered; and
the cast-enabled application configured to identify content included in the content repository, the content being streaming media including a video portion and an audio portion; and
a display device including a display area and at least one speaker, the display device being a cast-enabled device configured to:
receive the identified content when the cast-enabled application is launched based on the triggering of the alarm;
display the video portion of the identified content in the display area; and
play the audio portion of the identified content on the at least one speaker.

17. The system of claim 16, wherein the cast-enabled application is further configured to identifying the display device for execution of the identified content.

18. The system of claim 16, wherein the cast-enabled application is further configured to capture a specific intent when the cast-enabled application is launched.

19. The system of claim 16, wherein the cast-enabled application is further configured to utilize application specific parameters when the cast-enabled application is launched.

20. The system of claim 16, wherein the audio portion of the identified content includes music, and wherein the video portion of the identified content includes a picture.

21. A method, comprising:
setting an alarm on a computing device, the setting including:
setting a predetermined time to trigger the alarm;
receiving, in a user interface displayed on a display device included in the computing device, a selection of a cast-enabled application for launching when the alarm is triggered; and
identifying content for access by the cast-enabled application when the cast-enabled application is launched;
launching the cast-enabled application based on the triggering of the alarm;
identifying an external device for execution of the identified content, the computing device and the external device being connected to a network; and
controlling, by the cast-enabled application, providing of the identified content by a computer system connected to the network for execution on the external device, the external device including a display device and at least one speaker, and the identified content being streaming media.

22. The method of claim 21,
wherein the computing device is in communication with the computer system by way of the network,
wherein the streaming media includes video content for display in a display area of a display device included in the external device, and
wherein the streaming media includes audio content for playing on at least one speaker included in the external device.

23. The method of claim 21,
wherein the computing device is in communication with the computer system by way of the network, and
wherein the streaming media includes audio content for playing on at least one speaker included in the external device.

24. The method of claim 21, wherein the setting of the alarm is performed by an alarm application executing on the computing device.

25. The method of claim 21,
wherein identifying content for access by the cast-enabled application when launched includes identifying a specific intent for capture by the cast-enabled application, and
wherein launching the cast-enabled application based on the triggering of the alarm includes capturing, by the cast-enabled application, the specific intent.

26. The method of claim 21,
wherein identifying content for access by the cast-enabled application when launched includes identifying application specific parameters, and
wherein launching the cast-enabled application based on the triggering of the alarm includes providing the application specific parameters to the cast-enabled application.

27. The method of claim 26,
wherein the setting of the alarm is performed by an alarm application executing on the computing device, and
wherein the application specific parameters are set in the alarm application.

28. The method of claim 26, wherein the application specific parameters are set in a settings application executing on the computing device.

29. The method of claim 26, wherein the application specific parameters are determined by a user.

30. The method of claim 26, wherein the application specific parameters are based on user interactions with the cast-enabled application on the computing device.

* * * * *